United States Patent
Kawakatu et al.

(10) Patent No.: US 6,405,554 B1
(45) Date of Patent: Jun. 18, 2002

(54) REFRIGERATOR

(75) Inventors: Noriyasu Kawakatu; Akitoshi Ueno; Toshiaki Mukaidani; Takeo Ueno, all of Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/787,900

(22) PCT Filed: Sep. 29, 1999

(86) PCT No.: PCT/JP99/05308

§ 371 (c)(1),
(2), (4) Date: Mar. 28, 2001

(87) PCT Pub. No.: WO00/19155

PCT Pub. Date: Jun. 4, 2000

(30) Foreign Application Priority Data

Sep. 30, 1998 (JP) .............................. 10-277396

(51) Int. Cl.[7] .................................................. F25B 7/00
(52) U.S. Cl. ........................................... 62/335; 62/175
(58) Field of Search ...................................... 62/335, 175

(56) References Cited

U.S. PATENT DOCUMENTS

| | | | | |
|---|---|---|---|---|
| 4,313,309 A | * | 2/1982 | Lehman, Jr. ............... | 62/175 |
| 5,123,256 A | * | 6/1992 | Oltman ...................... | 307/39 |
| 5,241,829 A | * | 9/1993 | Irie et al. .................. | 62/204 |
| 5,323,618 A | * | 6/1994 | Yoshida et al. ............ | 165/902 |
| 5,475,986 A | * | 12/1995 | Bahel et al. ................ | 236/51 |
| 6,044,651 A | * | 4/2000 | Reason et al. .............. | 62/158 |
| 6,131,401 A | * | 10/2000 | Ueno et al. ................ | 165/208 |
| 6,161,391 A | * | 12/2000 | Trieskey .................... | 62/335 |

* cited by examiner

Primary Examiner—William E. Tapolcai
Assistant Examiner—Mohammad M. Ali
(74) Attorney, Agent, or Firm—Nixon Peabody LLP; Donald R. Studebaker

(57) ABSTRACT

The refrigerating system includes a low stage side refrigerant circuit (2) formed by connecting a low stage side compressor (4), a cascade condenser (5), a low stage side receiver (6), a low stage side expansion valve (7) formed of a temperature-sensitive expansion valve and an evaporator (8) in this order. The system also includes a high stage side refrigerant circuit (3) formed by connecting a high stage side compressor (9), a condenser (10), a high stage side receiver (11), a high stage side expansion valve (12) formed of a motor-operated expansion valve and the cascade condenser (5) in this order. The opening of the high stage side expansion valve (12) is adjusted so that the pressure sensed by a high-pressure sensor (SPH2) for sensing the high pressure in the low stage side refrigerant circuit (2) reaches a predetermined target high pressure.

12 Claims, 12 Drawing Sheets

REFRIGERATOR

TECHNICAL FIELD

The present invention relates to a refrigerating system, and particularly relates to a binary refrigerating system including a low stage side refrigerant circuit and a high stage side refrigerant circuit.

BACKGROUND ART

A binary refrigerating system has been conventionally used as a refrigerating system for a cold storage, a thermal-shock testing system or the like. The binary refrigerating system is constituted by a low stage side refrigerant circuit and a high stage side refrigerant circuit which are connected to each other through a cascade condenser as disclosed in Japanese Unexamined Patent Publication Gazette No. 9-210515.

With reference to FIG. 13, the conventional binary refrigerating system (200) will be now described. The low stage side refrigerant circuit (202) is formed by connecting a low stage side compressor (207), a cascade condenser (206), a low stage side receiver (208), a low stage side expansion valve (204) and an evaporator (209) in this order, while the high stage side refrigerant circuit (203) is formed by connecting a high stage side compressor (210), a condenser (212), a high stage side receiver (211), a high stage side expansion valve (205) and the cascade condenser (206) in this order. Further, in the conventional binary refrigerating system (200), the expansion valves (204) and (205) of the high stage side refrigerant circuit (203) and the low stage side refrigerant circuit (202) are each constituted by a temperature-sensitive thermostatic expansion valve (hereinafter, referred to as a temperature-sensitive expansion valve) Furthermore, the cascade condenser (206) is constituted by a double-pipe heat exchanger.

In the high stage side refrigerant circuit (203), a high stage side refrigerant discharged from the high stage side compressor (210) develops such circulation as to condense in the condenser (212), reduce its pressure in the high stage side expansion valve (205), evaporate in the cascade condenser (206) and return to the high stage side compressor (210). On the other hand, in the low stage side refrigerant circuit (202), a low stage side refrigerant discharged from the low stage side compressor (207) develops such circulation as to condense in the cascade condenser (206) to recover cold heat from the high stage side refrigerant, reduce its pressure in the low stage side expansion valve (204), evaporate in the evaporator (209) to cool substance to be cooled (ex., air), and return to the low stage side compressor (207).

Meanwhile, at the time of start-up of the system (200), the temperature in the cascade condenser (206) may not be decreased down to a predetermined condensation temperature for the low stage side refrigerant. For example, if the system (200) has been shut down for a long time, the temperature in the cascade condenser (206) rises up to around ordinary temperatures. Therefore, if the high stage side compressor (210) and the low stage side compressor (207) are started up at the same time, the low stage side refrigerant circuit (202) may be excessively raised in its high pressure, resulting in operation of a protective device such as a high-pressure switch in spite of the system (202) being in normal conditions. To cope with this and prevent such unintended behavior of the protective device, the system is generally arranged so that the high stage side compressor (210) is started up ahead of start-up of the low stage side compressor (207) and after the expiration of a certain period the low stage side compressor (207) is started up.

For the binary refrigerating systems, it is important to stabilize the high pressure in the low stage side refrigerant circuit (202) since their performance is determined mainly depending upon operating conditions of the low stage side refrigerant circuit (202). In the conventional binary refrigerating system, however, the temperature-sensitive expansion valve (205) is used for the high stage side refrigerant circuit (203) and therefore it takes a considerably long time (for example, about 5 minutes) to stabilize the superheating degree of the high stage side refrigerant at the outlet of the cascade condenser (206) after the start-up of the high stage side compressor (210). Accordingly, there has been a problem in the conventional binary refrigerating system in that even if the low stage side compressor (207) is started up behind a certain period, the temperature-sensitive expansion valve (205) cannot response to an abrupt increase in load resulting in operation of the protective device of the low stage side refrigerant circuit (202).

Particularly for a so-called multi-system equipped with low stage side refrigerant circuitry constituted by a plurality of pipelines including a plurality of low stage side compressors, respectively, if the number of low stage side compressors started up is changed, the temperature-sensitive expansion valve (205) of the high stage side refrigerant circuit (203) cannot response to load variations of the low stage side refrigerant circuit so that the protective device of the low stage side refrigerant circuit easily operates.

The present invention has been made in view of this problem and therefore its object is to improve operational responsiveness of the high stage side refrigerant circuit to the low stage side refrigerant circuit.

DISCLOSURE OF INVENTION

To attain the above object, the present invention employs a motor-operated expansion valve as an expansion mechanism in the high stage side refrigerant circuit and provides for controlling the motor-operated expansion valve so that the high pressure in the low stage side refrigerant circuit reaches a target high pressure. In other words, the present invention provides for controlling the expansion mechanism of the high stage side refrigerant circuit based on the conditions of the low stage side refrigerant circuit.

More specifically, a first invention is directed to a refrigerating system, which comprises: a high stage side refrigerant circuit (3, 120) formed by connecting a high stage side compressor (9, 18, 121), a condenser (10, 122), a motor-operated expansion valve (12, EVL1, EVL2) and a refrigerant heat exchanger (5, 111A, 111B) in this order; a low stage side refrigerant circuit (2, 103A, 103B) formed by connecting a low stage side compressor (4, 31A, 31B, 131A, 131B), the refrigerant heat exchanger (5, 111A, 111B), an expansion mechanism (7, EV21) and an evaporator (8, 50) in this order; a high-pressure sensing means (SPH2), provided in the low stage side refrigerant circuit (2, 103A, 103B), for sensing the high pressure in the low stage side refrigerant circuit (2, 103A, 103B); and an expansion valve control means (16) for controlling the motor-operated expansion valve (12, EVL1, EVL2) of the high stage side refrigerant circuit (2, 120) so that the pressure sensed by the high-pressure sensing means (SPH2) reaches a predetermined target high pressure.

With this arrangement, in the high stage side refrigerant circuit (3, 120), a high stage side refrigerant develops such circulation as to be discharged from the high stage side compressor (9, 18, 121), condense in the condenser (10, 122), reduce its pressure in the motor-operated expansion valve (12, EVL1, EVL2), evaporate in the refrigerant heat exchanger (5, 111A, 111B) and return to the high stage side compressor (9, 18, 121). On the other hand, in the low stage side refrigerant circuit (2, 103A, 103B), a low stage side refrigerant develops such circulation as to be discharged from the low stage side compressor (4, 31A, 31B, 131A, 131B), exchange heat with the high stage side refrigerant in the refrigerant heat exchanger (5, 111A, 111B) to condense, reduce its pressure in the expansion mechanism (7, EV21), evaporate in the evaporator (8, 50) for cooling substance to be cooled, and return to the low stage side compressor (4, 31A, 31B, 131A, 131B). The motor-operated expansion valve (12, EVL1, EVL2) of the high stage side refrigerant circuit (3, 120) is controlled directly for the low stage side refrigerant circuit (2, 103A, 103B) so that the high pressure in the low stage side refrigerant circuit (2, 103A, 103B) which is sensed by the high-pressure sensing means (SPH2) reaches the predetermined target high pressure, and operational responsiveness of the high stage side refrigerant circuit (3, 120) to the low stage side refrigerant circuit (2, 103A, 103B) is thereby improved.

A second invention is concerned with the first invention, wherein the system further comprises: a temperature sensing means (Tx) for sensing the temperature of the substance to be cooled by the evaporator (8, 50); and a target high pressure setting means (23) for setting the target high pressure of the expansion valve control means (16) based on the temperature sensed by the temperature sensing means (Tx).

With this arrangement, the target high pressure in the low stage side refrigerant circuit (2, 103A, 103B), which provides a standard for control of the motor-operated expansion valve (12, EVL1, EVL2), is adequately set based on the temperature of the substance to be cooled. As a result, the control of the motor-operated expansion valve (12, EVL1, EVL2) can be made in flexible response to load.

A third invention is concerned with the first invention, wherein the system further comprises: a low pressure sensing means (SPL2), provided in the low stage side refrigerant circuit (2, 103A, 103B), for sensing the low pressure in the low stage side refrigerant circuit (2, 103A, 103B); and a target high pressure setting means (23) for setting the target high pressure of the expansion valve control means (16) based on the pressure sensed by the low pressure sensing means (SPL2).

With this arrangement, the target high pressure in the low stage side refrigerant circuit (2, 103A, 103B), which provides a standard for control of the motor-operated expansion valve (12, EVL1, EVL2), is adequately set based on the low pressure in the low stage side refrigerant circuit (2, 103A, 103B). As a result, the control of the motor-operated expansion valve (12, EVL1, EVL2) can be made in flexible response to load.

A fourth invention is concerned with the first invention, wherein the system further comprises: a temperature sensing means (Tx) for sensing the temperature of the substance to be cooled by the evaporator (8); a low pressure sensing means (SPL2), provided in the low stage side refrigerant circuit (2), for sensing the low pressure in the low stage side refrigerant circuit (2); a transient state detecting means (23$a$) for determining whether the operation of the system is in a transient state based on preset particular determination conditions and outputting a predetermined transient state signal upon detection of the transient state or outputting a predetermined non-transient state signal upon detection of a non-transient state; and a target pressure setting means (23) for setting upon receipt of the transient state signal the target high pressure of the expansion valve control means (16) based on the temperature sensed by the temperature sensing means (Tx) or setting upon receipt of the non-transient state signal the target high pressure based on the pressure sensed by the low pressure sensing means (SPL2).

With this arrangement, the target high pressure is set based on the temperature of the substance to be cooled when the operation is in a transient state, or the target high pressure is set based on the low pressure in the low stage side refrigerant circuit (2) when the operation is in a non-transient state, i.e., steady.

A fifth invention is concerned with the first invention, wherein the system further comprises: a superheating degree detecting means (27) for sensing the superheating degree of a suction gas refrigerant of the high stage side compressor (18, 121) in the high stage side refrigerant circuit (3, 120); and the expansion valve control means (16) being arranged to control the motor-operated expansion valve (12, EVL1, EVL2) of the high stage side refrigerant circuit (2, 120) so that the pressure sensed by the high-pressure sensing means (SPH2) and the superheating degree sensed by the superheating degree detecting means (27) reach a predetermined target high pressure and a predetermined target superheating degree, respectively.

With this arrangement, the motor-operated expansion valve (12, EVL1, EVL2) is controlled so that the high pressure in the low stage side refrigerant circuit (2, 103A, 103B) reaches the target high pressure and the superheating degree of the suction gas refrigerant of the high stage side compressor (9, 121) in the high stage side refrigerant circuit (3, 120) reaches the target superheating degree. As a result, the high stage side compressor (9, 121) can be protected from liquid back and the like and at the same time the high pressure in the low stage side refrigerant circuit (2, 103A, 103B) can be held at a suitable value.

A sixth invention is concerned with the fifth invention, wherein the system further comprises: the expansion valve control means (16) being set to calculate a first amount of change of opening ($\Delta EV1$) based on the pressure sensed by the high-pressure sensing means (SPH2), calculate a second amount of change of opening ($\Delta EV2$) based on the superheating degree sensed by the superheating degree detecting means (27) and change the opening of the motor-operated expansion valve (12) of the high stage side refrigerant circuit (3) based on the first amount of change of opening ($\Delta EV1$) and the second amount of change of opening ($\Delta EV2$); and a setting change means (22$b$) for changing the setting of the expansion valve control means (16) so that the expansion valve control means (16) changes the opening of the motor-operated expansion valve (12) solely based on the second amount of change of opening ($\Delta EV2$) when the sensed superheating degree is a value beyond a predetermined range and the first amount of change of opening ($\Delta EV1$) is positive.

With this arrangement, the opening of the motor-operated expansion valve (12) in the high stage side refrigerant circuit (3) is changed in principle based on the first amount of change of opening ($\Delta EV1$) calculated based on the high pressure in the low stage side refrigerant circuit (2) and the second amount of change of opening ($\Delta EV2$) calculated based on the superheating degree of the suction gas in the high stage side refrigerant circuit (3). When the superheating degree of the suction gas is a value beyond the predetermined range and the first amount of change of opening ($\Delta EV1$) is positive, the opening of the motor-operated expansion valve (12) is exceptionally changed based on the second amount of change of opening (ΔEV2) alone.

A seventh invention is concerned with the first invention, wherein the system further comprises: a superheating degree detecting means (27) for sensing the superheating degree of a suction gas refrigerant of the high stage side compressor (121) in the high stage side refrigerant circuit (120); a discharge gas temperature sensing means (STH2) for sensing the temperature of a discharge gas of the low stage side compressor (31A, 31B, 131A, 131B) in the low stage side refrigerant circuit (103A, 103B); the expansion valve control means (16) being set to calculate a first amount of change of opening (ΔEV11, ΔEV21) based on the high pressure in the low stage side refrigerant circuit (103A, 103B), calculate a second amount of change of opening (ΔEV2) based on the superheating degree sensed by the superheating degree detecting means (27) and change the opening of the motor-operated expansion valve (EVL1, EVL2) of the high stage side refrigerant circuit (120) based on the first amount of change of opening (ΔEV11, ΔEV21) and the second amount of change of opening (ΔEV2); and a setting change means (23c) for calculating an amount of increase of opening (ΔEV13, ΔEV23) based on the temperature sensed by the discharge gas temperature sensing means (STH2) when the sensed temperature is equal to or above a predetermined temperature and then changing the setting of the expansion valve control means (16) so that the expansion valve control means (16) changes the opening of the motor-operated expansion valve (EVL1, EVL2) based on the first amount of change of opening (ΔEV11, ΔEV21) and the second amount of change of opening (ΔEV2) and additionally the amount of increase of opening (ΔEV13, ΔEV23)

With this arrangement, the opening of the motor-operated expansion valve (EVL1, EVL2) of the high stage side refrigerant circuit (120) is changed in principle based on the first amount of change of opening (ΔEV11, ΔEV21) calculated based on the high pressure in the low stage side refrigerant circuit (103A, 103B) and the second amount of change of opening (ΔEV2) calculated based on the superheating degree of the suction gas in the high stage side refrigerant circuit (120). When the temperature of the discharge gas of the low stage side compressor (31A, 31B, 131A, 131B) is equal to or above the predetermined temperature, the opening of the motor-operated expansion valve (EVL1, EVL2) is changed based on the first amount of change of opening (ΔEV11, ΔEV21) and the second amount of change of opening (ΔEV2) exceptionally considering the amount of increase of opening (ΔEV13, ΔEV23) based on the temperature of the discharge gas.

An eighth invention is concerned with the first invention, wherein the system further comprises: a superheating degree detecting means (27) for sensing the superheating degree of a suction gas refrigerant of the high stage side compressor (121) in the high stage side refrigerant circuit (120); a discharge gas temperature sensing means (STH1) for sensing the temperature of a discharge gas refrigerant of the high stage side compressor (121) in the high stage side refrigerant circuit (120); the expansion valve control means (16) being set to calculate a first amount of change of opening (ΔEV11, ΔEV21) based on the high pressure in the low stage side refrigerant circuit (103A, 103B), calculate a second amount of change of opening (ΔEV2) based on the superheating degree sensed by the superheating degree detecting means (27) and change the opening of the motor-operated expansion valve (EVL1, EVL2) of the high stage side refrigerant circuit (120) based on the first amount of change of opening (ΔEV11, ΔEV21) and the second amount of change of opening (ΔEV2); and a setting change means (23c) for calculating an amount of increase of opening (ΔEV4) based on the temperature sensed by the discharge gas temperature sensing means (STH1) when the sensed temperature is equal to or above a predetermined temperature and then changing the setting of the expansion valve control means (16) so that the expansion valve control means (16) changes the opening of the motor-operated expansion valve (EVL1, EVL2) based on the first amount of change of opening (ΔEV11, ΔEV21) and the second amount of change of opening (ΔEV2) and additionally the amount of increase of opening (ΔEV4) With this arrangement, the opening of the motor-operated expansion valve (EVL1, EVL2) of the high stage side refrigerant circuit (120) is changed in principle based on the first amount of change of opening (ΔEV11, ΔEV21) calculated based on the high pressure in the low stage side refrigerant circuit (103A, 103B) and the second amount of change of opening (ΔEV2) calculated based on the superheating degree of the suction gas in the high stage side refrigerant circuit (120). When the temperature of the discharge gas of the high stage side compressor (121) is equal to or above the predetermined temperature, the opening of the motor-operated expansion valve (EVL1, EVL2) is changed based on the first amount of change of opening (ΔEV11, ΔEV21) and the second amount of change of opening (ΔEV2) exceptionally considering the amount of increase of opening (ΔEV4) based on the temperature of the discharge gas.

A ninth invention is concerned with the first invention, wherein the system further comprises: a superheating degree detecting means (27) for sensing the superheating degree of a suction gas refrigerant of the high stage side compressor (121) in the high stage side refrigerant circuit (120); a discharge gas temperature sensing means (STH1) for sensing the temperature of a discharge gas of the high stage side compressor (121) in the high stage side refrigerant circuit (120); a wet state detecting means (22a) for determining whether the suction gas refrigerant of the high stage side compressor (121) in the high stage side refrigerant circuit (120) is in a wet state based on preset determination conditions and outputting a predetermined wet state signal upon detection of the wet state; the expansion valve control means (16) being set to calculate a first amount of change of opening (ΔEV11, ΔEV21) based on the high pressure in the low stage side refrigerant circuit (103A, 103B), calculate a second amount of change of opening (ΔEV2) based on the superheating degree sensed by the superheating degree detecting means (27) and change the opening of the motor-operated expansion valve (EVL1, EVL2) of the high stage side refrigerant circuit (120) based on the first amount of change of opening (ΔEV11, ΔEV21) and the second amount of change of opening (ΔEV2); and a setting change means (23c) for calculating an amount of decrease of opening (ΔEV5) based on the wet state upon receipt of the wet state signal from the wet state detecting means (22a) and then changing the setting of the expansion valve control means (16) so that the expansion valve control means (16) changes the opening of the motor-operated expansion valve (EVL1, EVL2) based on the first amount of change of opening (ΔEV11, ΔEV21) and the second amount of change of opening (ΔEV2) and additionally the amount of decrease of opening (ΔEV5).

With this arrangement, the opening of the motor-operated expansion valve (EVL1, EVL2) of the high stage side refrigerant circuit (120) is changed in principle based on the first amount of change of opening (ΔEV11, ΔEV21) calculated based on the high pressure in the low stage side refrigerant circuit (103A, 103B) and the second amount of change of opening (ΔEV2) calculated based on the superheating degree of the suction gas in the high stage side refrigerant circuit (120). When the suction gas of the high stage side compressor (121) is in a wet condition, the opening of the motor-operated expansion valve (EVL1, EVL2) is changed based on the first amount of change of opening (ΔEV11, ΔEV21) and the second amount of change of opening (ΔEV2) exceptionally considering the amount of decrease of opening (ΔEV5) based on the wet state.

A tenth invention is concerned with the first invention, wherein the system further comprises an opening change means (22d) for sensing the opening of the motor-operated expansion valve (12) and causing the expansion valve control means (16) to change the amount of change of opening according to the sensed opening to increase the amount of change of opening when the opening is large or decrease the amount of change of opening when the opening is small.

With this arrangement, the amount of change of opening is reset at a relatively large value when the opening of the motor-operated expansion valve (12) is large, or reset at a relatively small value when the opening of the motor-operated expansion valve (12) is small. This results in preventing the motor-operated expansion valve (12) from being excessively opened and closed.

An eleventh invention is concerned with the first invention, wherein the system further comprises: an accumulator (24) provided between the refrigerant heat exchanger (5) and the suction side of the high stage side compressor (18) in the high stage side refrigerant circuit (3); and an opening change means (22d) for sensing a change in the opening of the motor-operated expansion valve (12) and causing the expansion valve control means (16) to change the amount of change of opening according to increase/decease in the sensed opening to decrease the amount of change of opening when the opening is increased or increase the amount of change of opening when the opening is decreased.

With this arrangement, the amount of change of opening is reset at a relatively small value when the opening of the motor-operated expansion valve (12) is increased, or reset at a relatively large value when the opening of the motor-operated expansion valve (12) is decreased. This results in preventing excessive liquid storage in the accumulator (24).

A twelfth invention is concerned with the first invention, wherein the refrigerant heat exchanger is constituted by a plate-type heat exchanger (5).

With this arrangement, since the plate-type heat exchanger has a characteristic of difficulty in providing superheat to the refrigerant at the outlet thereof, the effects of the first invention can be remarkably shown.

As seen from the above, according to the first invention, since the motor-operated expansion valve of the high stage side refrigerant circuit is controlled so that the high pressure in the low stage side refrigerant circuit reaches the predetermined target high pressure, operation of the high stage side refrigerant circuit can be directly controlled in accordance with operating conditions of the low stage side refrigerant circuit thereby improving operational responsiveness of the high stage side refrigerant circuit. Further, since the high pressure in the low stage side refrigerant circuit can be directly adjusted, a high-efficiency cooling operation can be provided. Furthermore, since the high stage side refrigerant circuit can immediately follow up an abrupt load change of the low stage side refrigerant circuit, unsuitable operation of the protective device of the low stage side refrigerant circuit can be obviated. Particularly for the so-called multi-system formed by composing the low stage side refrigerant circuitry of a plurality of pipelines, the load variation of the low stage side refrigerant circuit is extremely large and therefore the effects of the present invention can be exerted more remarkably.

According to the second invention, since the target high pressure is adequately set based on the temperature of the substance to be cooled, the high pressure in the low stage side refrigerant circuit can be set adequately in accordance with load variations to improve the efficiency of the system even if the temperature in the cold storage has extremely risen as caused, for example, at the shipping and receipt of goods or after defrosting. Further, even if the load is changed depending upon the type of the substance to be cooled, for example, even if the in-storage temperature setting to the cold storage is changed depending upon the type of goods therein, the target high pressure can be set adequately. This enables high-efficiency operation.

According to the third invention, even if the low stage side refrigerant circuit has remarkably increased in load as caused, for example, when the evaporator has frosted, the target high pressure in the low stage side refrigerant circuit can be set adequately at a suitable value. Accordingly, the high pressure in the low stage side refrigerant circuit can be held at the suitable value at any time thereby improving the efficiency of the system.

According to the fourth invention, since the target high pressure is set based on the temperature of the substance to be cooled when the operation is in a transient state or set based on the low pressure in the low stage side refrigerant circuit when the operation is steady, this prevents the target high pressure from abruptly changing when the operation is in a transient state and therefore provides stable operation.

According to the fifth or sixth invention, since the motor-operated expansion valve is controlled also considering the superheating degree of the suction gas in the high stage side refrigerant circuit, the high pressure in the low stage side refrigerant circuit can be held at a suitable value while protecting the high stage side compressor in the high stage side refrigerant circuit even under severe service conditions, such as when the evaporator has excessively frosted.

According to the seventh invention, even if the temperature of the discharge gas of the low stage side compressor has excessively increased, the low stage side compressor can be protected thereby enhancing system reliability.

According to the eighth invention, even if the temperature of the discharge gas of the high stage side compressor has excessively increased, the high stage side compressor can be protected thereby enhancing system reliability.

According to the ninth invention, since liquid back of the high stage side compressor can be obviated even in a transient operating state or under severe service conditions, this enhances system reliability.

According to the tenth invention, since the amount of change of opening of the motor-operated expansion valve is changed according to the opening, this prevents the motor-operated expansion valve from being excessively opened and closed resulting in facilitating implementation of stable control.

According to the eleventh invention, since the opening change of the motor-operated expansion valve is made relatively slowly for control in its opening direction or made relatively rapidly for control in its closing direction, this prevents excessive liquid storage into the accumulator resulting in facilitating implementation of stable control.

According to the twelfth invention, since the refrigerant heat exchanger is constituted by a plate-type heat exchanger, the effects of the first invention can be exerted more remarkably.

BEST MODE FOR CARRYING OUT THE INVENTION Hereinafter, embodiments of the present invention will be described with reference to the drawings.

First Embodiment

Figure 1:
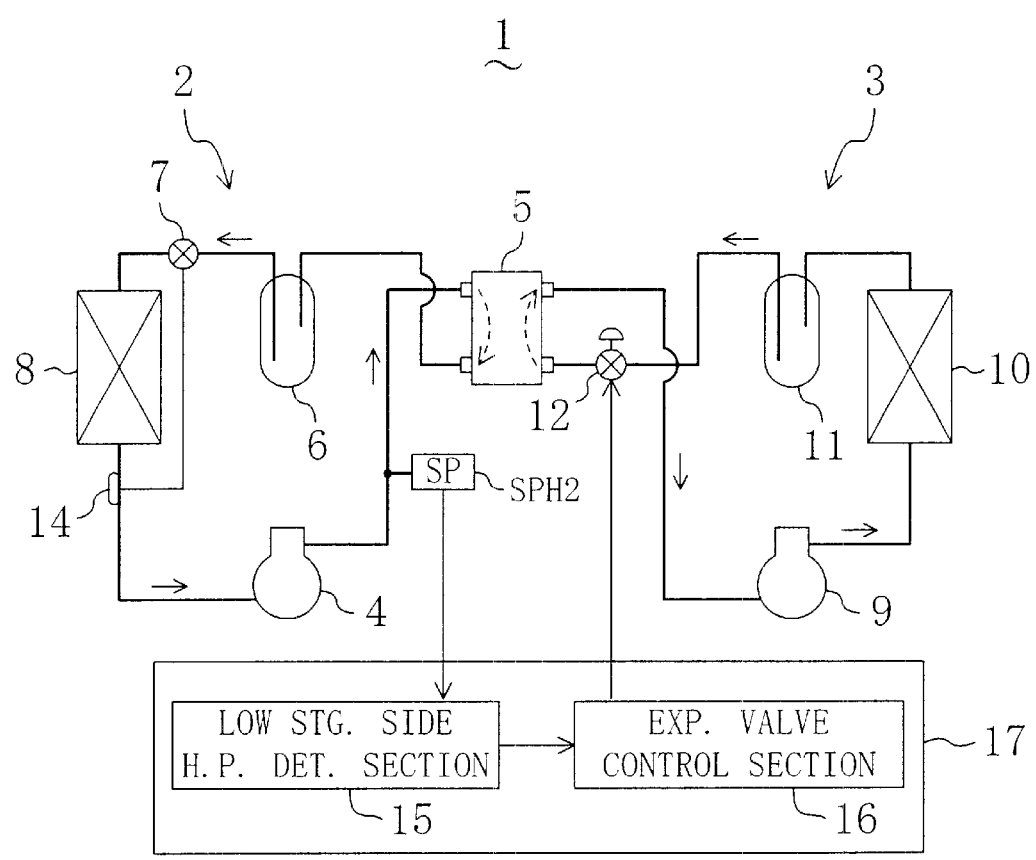
FIG. 1 is a diagram showing the structure of a refrigerating system according to a first embodiment.

As shown in FIG. 1, a refrigerating system (1) according to a first embodiment is a so-called binary refrigerating system provided in a cold storage, and includes a low stage side refrigerant circuit (2) and a high stage side refrigerant circuit (3).

The low stage side refrigerant circuit (2) is formed by connecting a low stage side compressor (4), a cascade condenser (5) as a refrigerant heat exchanger, a low stage side receiver (6), a low stage side expansion valve (7) and an evaporator (8) for cooling the in-storage air in this order. The low stage side expansion valve (7) is constituted by a temperature-sensitive expansion valve. A temperature sensing bulb (14) connected to the low stage side expansion valve (7) is fixed to part of a refrigerant pipe located between the evaporator (8) and the low stage side compressor (4) and in the vicinity of the evaporator (8). The cascade condenser (5) is constituted by a plate-type heat exchanger formed by laminating a large number of heat-transfer plates. Between the low stage side compressor (4) and the cascade condenser (5), a high-pressure sensor (SPH2) is provided as a high-pressure sensing means for sensing the high pressure in the low stage side refrigerant circuit (2).

The high stage side refrigerant circuit (3) is formed by connecting a high stage side compressor (9), a condenser (10), a high stage side receiver (11), a high stage side expansion valve (12) formed of a motor-operated expansion valve and the cascade condenser (5) in this order.

The refrigerating system (1) includes a controller (17) having a low stage side high pressure detecting section (15) and an expansion valve control section (16). The low stage side high pressure detecting section (15) is connected to the high-pressure sensor (SPH2) and arranged to receive a pressure sensed by the high-pressure sensor (SPH2). The expansion valve control section (16) is connected to the low stage side high pressure detecting section (15) and arranged to determine the amount of change of the opening of the high stage side expansion valve (12) based on the pressure sensed by the high-pressure sensor (SPH2) so that the sensed pressure reaches a predetermined target high pressure and then output a pulse signal corresponding to the amount of change of the opening to the high stage side expansion valve (12).

In this refrigerating system (1), the low stage side compressor (4) and the high stage side compressor (9) are concurrently started up to concurrently operate both the low stage side refrigerant circuit (2) and the high stage side refrigerant circuit (3). The refrigerant circulation in both the low stage side refrigerant circuit (2) and the high stage side refrigerant circuit (3) is the same as in the conventional refrigerating system and therefore description thereof will be omitted.

Next, control over the expansion valve of the refrigerating system (1) will be described. In this embodiment, the setting temperature in the storage in which the refrigerating system (1) is installed is kept at a certain temperature (ex., −20° C.) predetermined. In other words, the refrigerating system (1) carries out a refrigerating operation to keep the temperature in the storage at −20° C. Specifically, the expansion valve control section (16) effects control so that the high pressure in the low stage side refrigerant circuit (2) reaches a predetermined target high pressure (for example, a value of equivalent saturated pressure for a saturation temperature of 15° C.)

More specifically, the low stage side high pressure detecting section (15) of the controller (17) receives the sensed pressure from the high-pressure sensor (SPH2) at regular intervals (for example, at every 10 seconds) and then outputs the received value to the expansion valve control section (16). The expansion valve control section (16) determines, based on the high pressure in the low stage side refrigerant circuit (2), the opening of the high stage side expansion valve (12) in the following manner.

If it is assumed that the points in time when the high pressure is sensed by the high-pressure sensor (SPH2) at regular intervals are represented by $t_{N-1}$, $t_N$, . . . , respectively and the equivalent saturation temperatures for the high pressures in the low stage side refrigerant circuit (2) at the points in time $t_{N-1}$ and $t_N$ are represented by $T_{CN-1}$ and $T_{CN}$ (° C.), respectively, variances in amount of control at these points in time are $\epsilon_{N-1}=T_{CN-1}-15$ and $\epsilon_N=T_{CN}-15$. Then, the expansion valve control section (16) determines the amount of change of opening (output pulse number) $\Delta EV$ of the high stage side expansion valve (12) to be $\Delta EV = a\epsilon_N + b(\epsilon_N - \epsilon_{N-1})$. It is to be herein noted that a and b are specified constants, respectively. For example, with a=1, b=5, $T_{CN-1}=16°$ C. and $T_{CN}=17°$ C., the pulse number is $\Delta EV=7$ and therefore the high stage side expansion valve (12) is opened by 7 pulses during 10 seconds from the point in time $t_{N-1}$ to the point in time $t_N$.

The control over the opening of the high stage side expansion valve (12) is not limited to such PI control as described above. For example, the amount of change of opening may be previously set in accordance with the variance $\epsilon_N$ as shown in the below table and the control may be made based on the set amount. That is, the variance $\epsilon_N$ in amount of control may be previously classified into plural zones and the amount of change of opening may be set stepwise in accordance with each zone.

| $\epsilon N < -17$ | $-17 \leq \epsilon N < -10$ | $-10 \leq \epsilon N < -3$ | $-3 \leq \epsilon N < 3$ | $3 \leq \epsilon N < 10$ | $10 \leq \epsilon N < 17$ | $17 \leq \epsilon N$ |
|---|---|---|---|---|---|---|
| $\Delta EV = -20$ | $\Delta EV = -4$ | $\Delta EV = -1$ | $\Delta EV = 0$ | $\Delta EV = 1$ | $\Delta EV = 4$ | $\Delta EV = 20$ |

As apparent from the above, in the refrigerating system (1), since the high stage side expansion valve (12) of the high stage side refrigerant circuit (3) is constituted by the motor-operated expansion valve and the opening of the high stage side expansion valve (12) is controlled so that the high pressure in the low stage side refrigerant circuit (2) reaches the target high pressure, the high stage side refrigerant circuit (3) can be responded promptly and correctly to the low stage side refrigerant circuit (2).

Further, though a plate-type heat exchanger generally has a characteristic of difficulty in superheating the refrigerant at the outlet thereof, the plate-type heat exchanger used as the cascade condenser (5) in this embodiment can provide high-efficiency operation (operation with a high EER) since the high stage side expansion valve (12) is controlled based on the high pressure in the low stage side refrigerant circuit (2).

Second Embodiment

Figure 2:
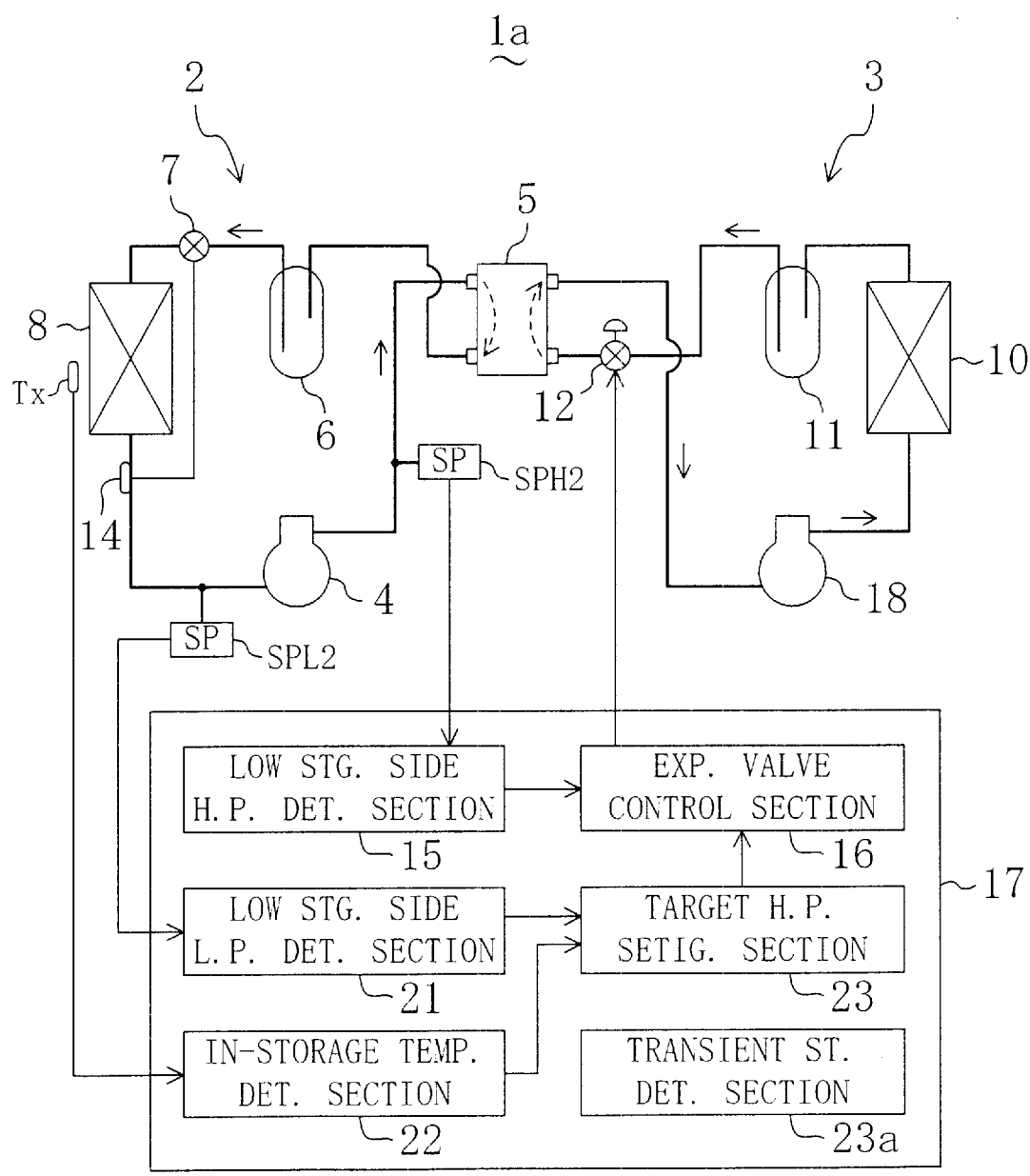
FIG. 2 is a diagram showing the structure of a refrigerating system according to a second embodiment.

As shown in FIG. 2, a refrigerating system (1a) according to a second embodiment is formed by adding the following changes to the refrigerating system (1) of the first embodiment. Like parts as in the refrigerating system (1) of the first embodiment are identified by similar reference characters and description thereof will be omitted.

In this refrigerating system (1a), the high stage side compressor (18) of the high stage side refrigerant circuit (3) is constituted by a compressor capable of free capacity control, for example, by an inverter-controlled compressor. At the suction side of the low stage side compressor (18) of the low stage side refrigerant circuit (2), a low-pressure sensor (SPL2) is provided as a low-pressure sensing means for sensing the low pressure. Further, in the storage, a temperature sensor (Tx) is placed as a temperature sensing means for sensing the in-storage air temperature.

The controller (17) includes, in addition to the low stage side high pressure detecting section (15) and the expansion valve control section (16), a low pressure side low pressure detecting section (21), an in-storage temperature detecting section (22) and a target high pressure setting section (23). The low stage side low pressure detecting section (21) is connected to the low-pressure sensor (SPL2) and arranged to receive a signal corresponding to a pressure sensed by the low-pressure sensor (SPL2). The in-storage temperature detecting section (22) is connected to the temperature sensor (Tx) and arranged to receive a signal corresponding to a temperature sensed by the temperature sensor (Tx). The target high pressure setting section (23) is connected to the low stage side low pressure detecting section (21) and the in-storage temperature detecting section (22), and arranged to adequately set a target high pressure in the low stage side refrigerant circuit (2) based on the low pressure in the low stage side refrigerant circuit (2) and the in-storage temperature and output a specified control signal corresponding to the target high pressure to the expansion valve control section (16). The controller (17) is also provided with a transient state detecting section (23a) for determining whether operation is in a transient state based on preset determination conditions and outputting a transient state signal or a non-transient state signal to the expansion valve control section (16).

While the target high pressure in the low stage side refrigerant circuit (2) is constant in the first embodiment, the target high pressure is changed adequately based on the in-storage temperature or the low pressure in the low stage side refrigerant circuit (2) in this refrigerating system (1a).

Figure 3:
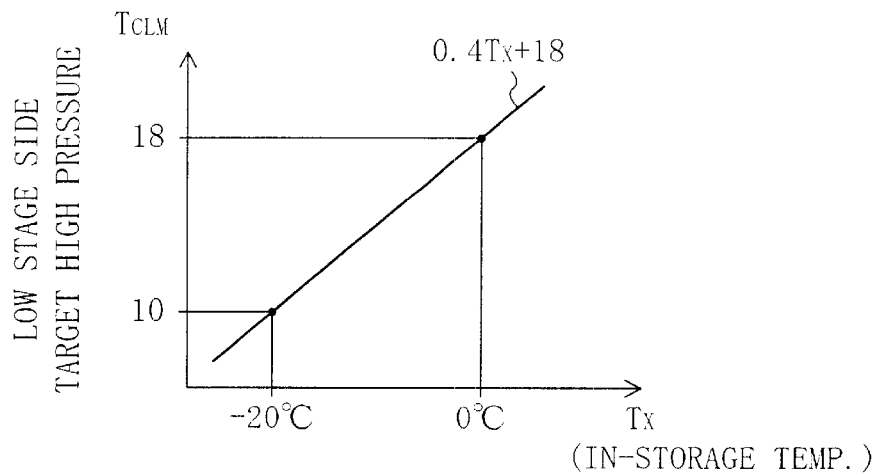
FIG. 3 is a graph showing the target high pressure based on the in-storage temperature.
Figure 4:
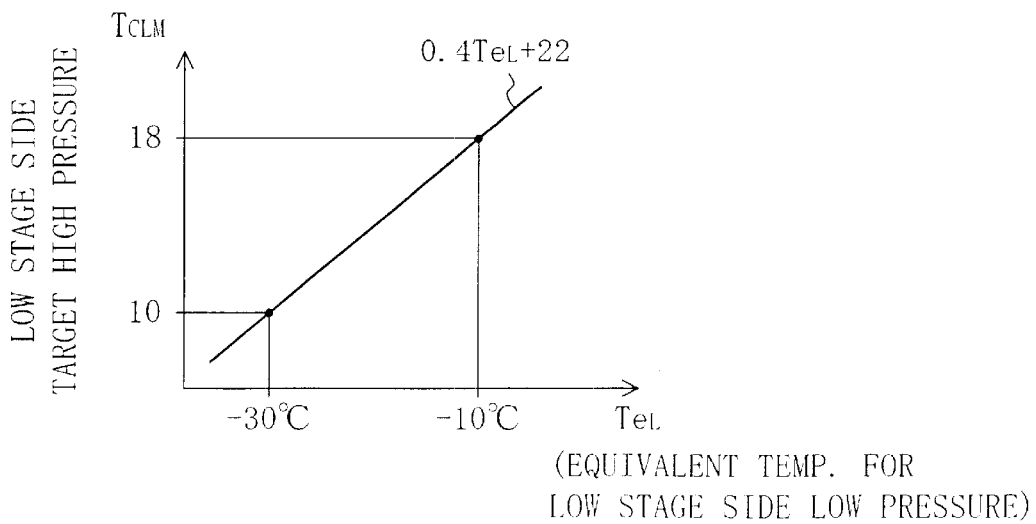
FIG. 4 is a graph showing the target high pressure based on the equivalent saturation temperature for the low pressure in a low stage side refrigerant circuit.
Figure 5:
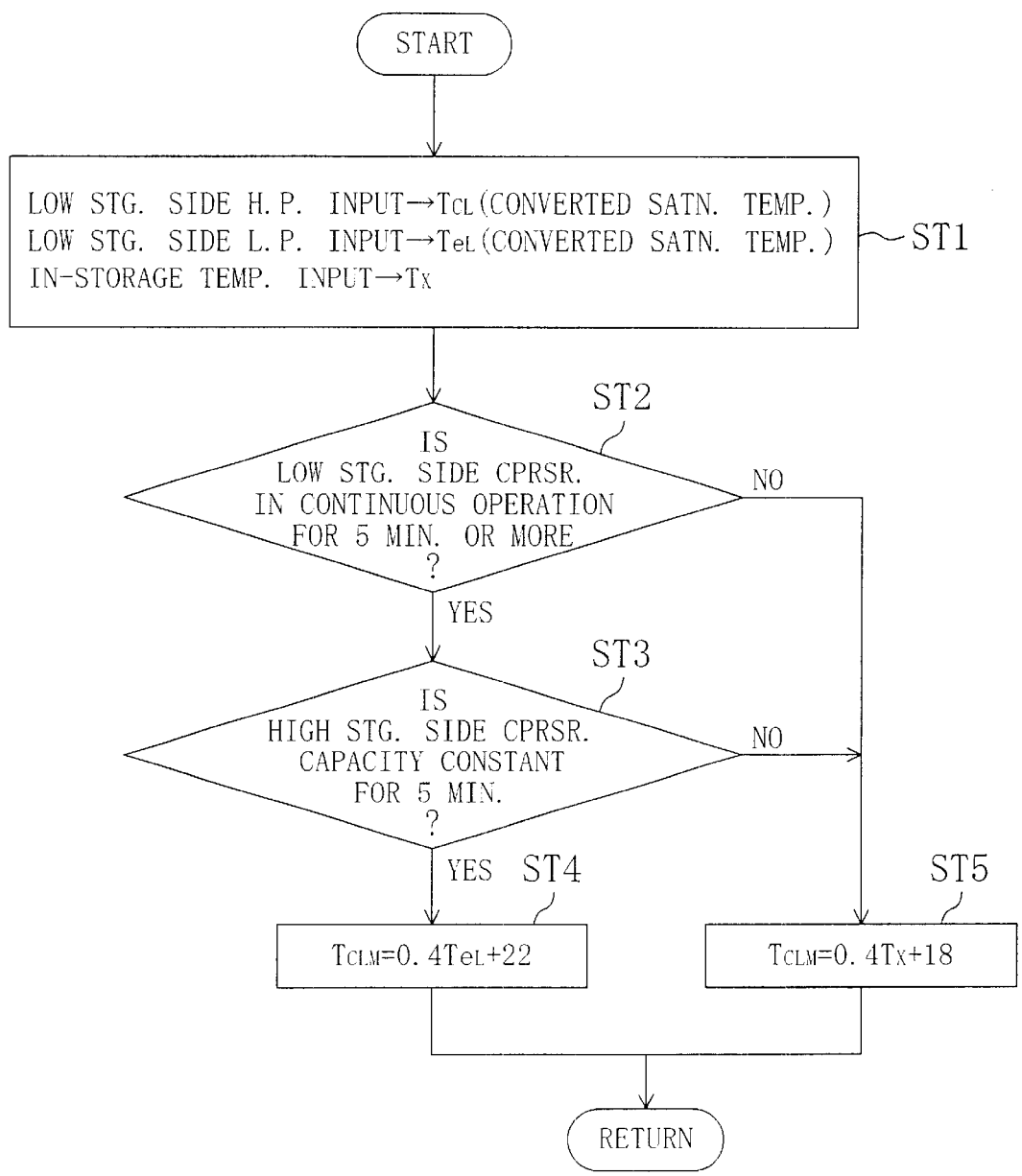
FIG. 5 is a flow chart of control over an expansion valve according to the second embodiment.

The target high pressure setting section (23) stores the relation between the in-storage temperature and the target high pressure as shown in FIG. 3 and the relation between the equivalent saturation temperature for the low stage side low pressure and the target high pressure as shown in FIG. 4. The target high pressure setting section (23) then sets, based on these relations, a target high pressure following a flow chart shown in FIG. 5. Specifically, in step ST1, the high-pressure sensor (SPH2) senses the high pressure in the low stage side refrigerant circuit (2), the low-pressure sensor (SPL2) senses the low pressure in the low stage side refrigerant circuit (2), and an equivalent saturation temperature $Tc_L$ for the high pressure and an equivalent saturation temperature $Te_L$ for the low pressure are calculated. Further, the temperature sensor (Tx) senses the in-storage temperature Tx. Next, in step ST2 and step ST3, the transient state detecting section (23a) determines whether operation is in a transient state. In step ST2, it is determined whether the low stage side compressor (4) has operated continuously for a specified period (5 minutes) or more. If the low stage side compressor (4) is in continuous operation, the process proceeds with step ST3. If the low stage side compressor (4) is not in continuous operation for the specified period or more, operation is determined to be in a transient state and the process then proceeds with step ST5. In step ST3, it is determined whether the capacity of the high stage side compressor (18) has been substantially constant for the specified period. If YES, operation is determined to be in a non-transient state and the process proceeds with step ST4. If NO, operation is determined to be in a transient state and the process proceeds with step ST5. Step ST4 is processing for determining the amount of change of the opening in the non-transient state where operation is steady. In this step ST4, an equivalent saturation temperature $Tc_{LM}$ (° C.) for a target high pressure is determined to be $Tc_{LM}=0.4Te_L+22$. On the other hand, step ST5 is processing for determining the amount of change of the opening in the transient state. In step ST5, an equivalent saturation temperature $Tc_{LM}$ (° C.) for a target high pressure is determined to be $Tc_{LM}=0.4Tx+18$. It is to be noted that these processing in steps ST4 and ST5 are carried out by the target high pressure setting section (23). Then, the target high pressure is calculated from either one of these equivalent saturation temperatures $Tc_{LM}$ (° C.), and thereafter in the same manner as in the first embodiment, the opening of the high stage side expansion valve (12) is adjusted so that the high pressure in the low stage side refrigerant circuit (2) reaches the target high pressure.

As apparent from the above, according to the second embodiment, the high pressure in the low stage side refrigerant circuit (2) can be suitably controlled in a wide range of operating conditions including pull-down operation for decreasing the in-storage temperature. Further, even if the evaporator (8) has frosted to reduce the low pressure in the low stage side refrigerant circuit (2), the high pressure in the low stage side refrigerant circuit (2) can be kept at a suitable value.

Third Embodiment

Figure 6:
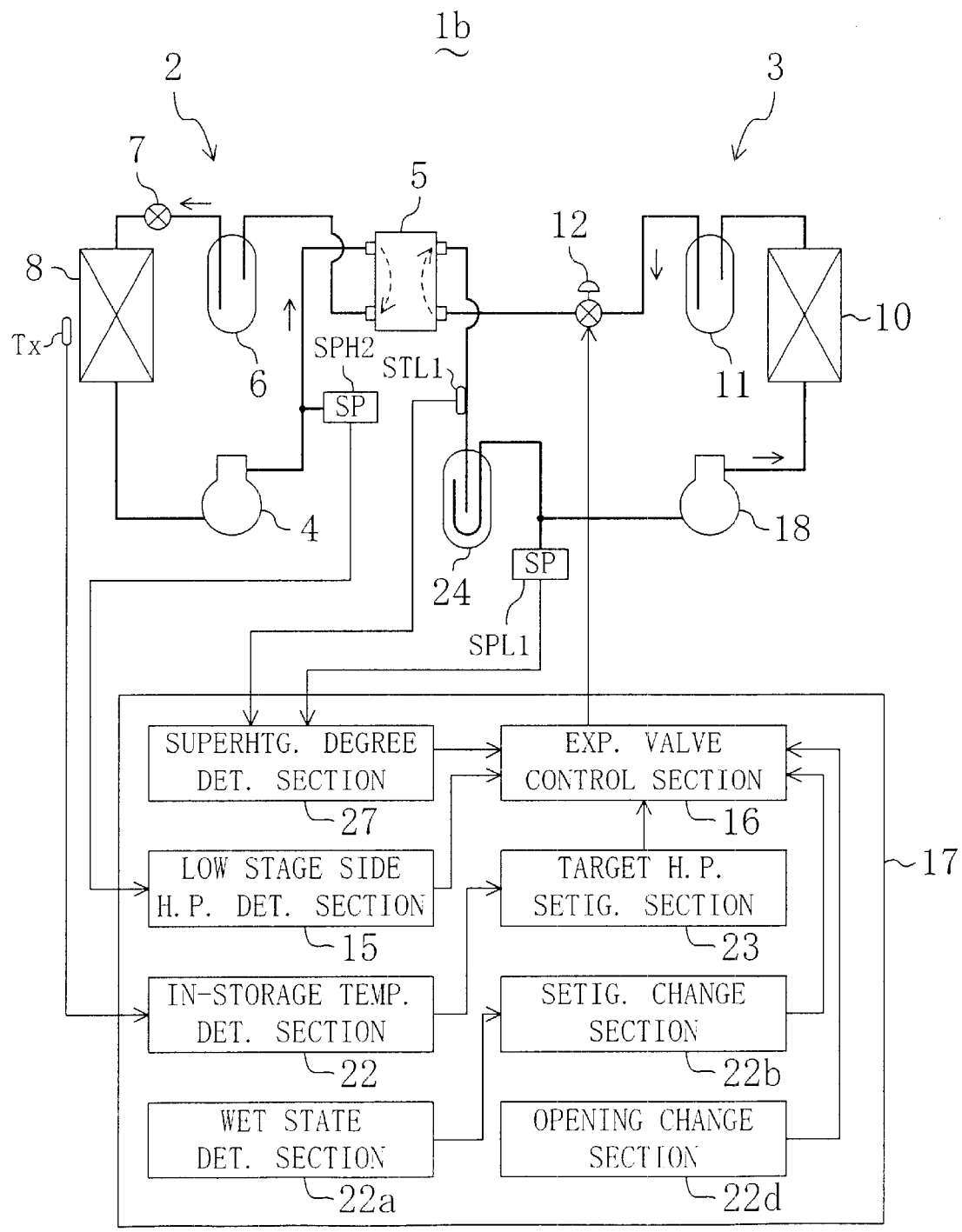
FIG. 6 is a diagram showing the structure of a refrigerating system according to a third embodiment.

A refrigerating system (1b) according to a third embodiment shown in FIG. 6 is also formed by adding some changes to the refrigerating system (1) of the first embodiment. Like parts as in the first embodiment are identified by similar reference characters and description thereof will be omitted.

In this refrigerating system (1b), the high stage side compressor (18) of the high stage side refrigerant circuit (3) is constituted by a compressor capable of free capacity control. In the storage, a temperature sensor (Tx) is placed for sensing the in-storage air temperature. In the pipe located on the suction side of the high stage side compressor (18) of the high stage side refrigerant circuit (3), a low-pressure sensor (SPL1) is provided as a low-pressure sensing means for sensing the low pressure in the high stage side refrigerant circuit (3). An accumulator (24) is provided between the cascade condenser (5) and the high stage side compressor (18). In the pipe between the cascade condenser (5) and the accumulator (24), a temperature sensor (STL1) is fixed for sensing the temperature of a refrigerant in the pipe.

The controller (17) includes, in addition to the low stage side high pressure detecting section (15) and the expansion valve control section (16), an in-storage temperature detecting section (22), a target high pressure setting section (23) and a superheating degree detecting section (27). The in-storage temperature detecting section (22) is connected to the temperature sensor (Tx) and arranged to receive a detection signal of the temperature sensor (Tx). The target high pressure setting section (23) is connected to the in-storage temperature detecting section (22) and arranged to set the target high pressure in the low stage side refrigerant circuit (2) based on the in-storage temperature and output a specified control signal corresponding to the target high pressure to the expansion valve control section (16). The superheating degree detecting section (27) is connected to the low-pressure sensor (SPL1) and the temperature sensor (STL1), and detect the superheating degree of a suction gas in the high stage side refrigerant circuit (3) based on the low pressure in the high stage side refrigerant circuit (3), which has been sensed by the low-pressure sensor (SPL1), and the suction gas temperature of the high stage side compressor (18), which has been sensed by the temperature sensor (STL1). The superheating degree detecting section (27) then outputs a specified detection signal corresponding to the superheating degree of the suction gas. The expansion valve control section (16) is connected to the low stage side high pressure detecting section (15), the target high pressure setting section (23) and the superheating degree detecting section (27) and determines the amount of control of the opening of the high stage side expansion valve (12). The expansion valve control section (16) is further arranged to calculate a first amount of change of opening $\Delta EV1$ based on the detection signal from the low stage side high pressure detecting section (15) and the control signal from the target high pressure setting section (23), calculate a second amount of change of opening $\Delta EV2$ based on the detection signal from the superheating degree detecting section (27) and change the opening of the high stage side expansion valve (12) in accordance with the total sum of the first amount of change of opening $\Delta EV1$ and the second amount of change of opening $\Delta EV2$. The controller (17) is further provided with a wet state detecting section (22a) for determining whether the suction gas refrigerant of the high stage side compressor (18) is in a wet state and outputting a specified wet state signal upon detection of the wet state and a setting change section (22b) for changing the setting of the expansion valve control section (16) depending upon the wet state. Furthermore, the controller (17) is provided with an opening change section (22d) for changing the amount of change of opening in accordance with the opening or the change of the opening of the high stage side expansion valve (12).

Figure 7:
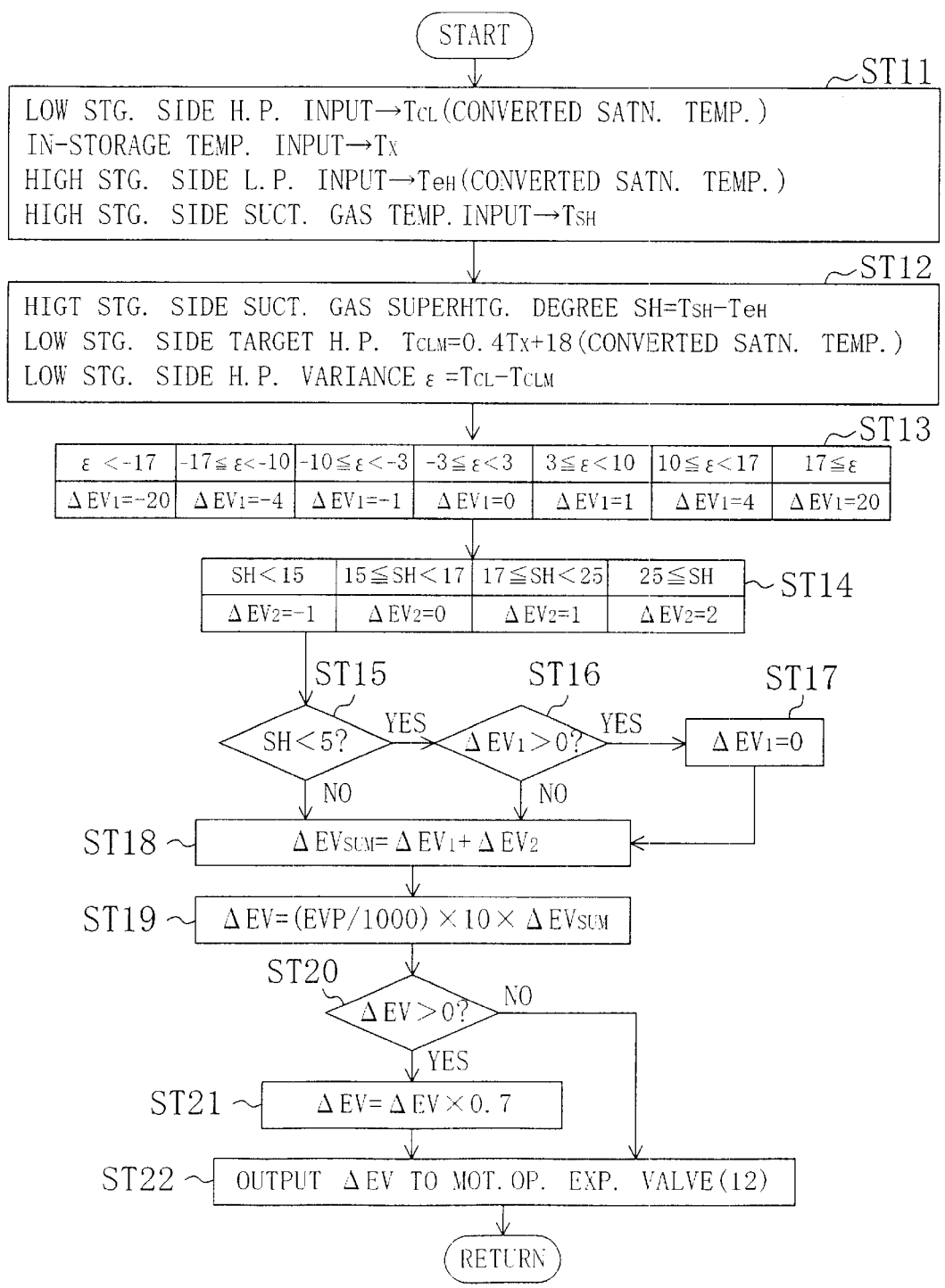
FIG. 7 is a flow chart of control over an expansion valve according to the third embodiment.

The target high pressure in the low stage side refrigerant circuit (2) is determined based on the in-storage temperature in the same manner as in the second embodiment. The amount of change of opening $\Delta EV$ of the high stage side expansion valve (12) is determined following a flow chart shown in FIG. 7.

Specifically, first in step ST11, the low stage side high pressure detecting section (15) receives a detection signal of the high-pressure sensor (SPH2), the in-storage temperature sensor (22) receives a detection signal of the temperature sensor (Tx), the superheating degree detecting section (27) receives detection signals of the temperature sensor (STL1) and the low-pressure sensor (SPL1), and from these detection signals, an equivalent saturation temperature $Tc_L$ for a high pressure in the low stage side refrigerant circuit (2), an in-storage temperature Tx, an equivalent saturation temperature $Te_H$ for a low pressure in the high stage side refrigerant circuit (3) and a suction gas temperature $Ts_H$ in the high stage side refrigerant circuit (3) are input.

Next, the process proceeds with step ST12 to calculate a superheating degree SH of a suction gas in the high stage side refrigerant circuit (3), a target high pressure $Tc_{LM}$ in the low stage side refrigerant circuit (2) and a variance E in high pressures of the low stage side refrigerant circuit (2) (hereinafter, referred to as a low stage side high pressure variance).

Then, the process proceeds with step ST13 to determine the first amount of change of opening $\Delta EV1$ in accordance with the low stage side high pressure variance $\epsilon$. Next, the process proceeds with step ST14 to determine the second amount of change of opening $\Delta EV2$ in accordance with the superheating degree of the suction gas in the high stage side refrigerant circuit (3).

Next, in step ST15, it is determined whether the suction gas in the high stage side refrigerant circuit (3) is in a wet state. More specifically, determination of whether it be in a wet state is made based on whether the superheating degree of the high stage side suction gas is smaller than a predetermined temperature (5° C.). If the superheating degree of the suction gas is 5° C. or larger, it is determined that the suction gas is not in a wet state and the process proceeds with step ST18. On the contrary, if the superheating degree of the suction gas is smaller than 5° C., the suction gas is determined to be in a wet state and the process proceeds with step ST16. In step ST16, it is determined whether the value of the first amount of change of opening $\Delta EV1$ is positive, i.e., whether the first amount of change of opening $\Delta EV1$ based on the low stage side high pressure variance $\epsilon$ is an amount of control in a direction to open the high stage side expansion valve (12). If the result of this determination is YES, the process proceeds with step ST17, resets ΔEV1 at zero and then proceeds with step ST18. That is, the amount of change of opening is set based on the second amount of change of opening alone. It is to be noted that these processing in steps ST16 and ST17 are carried out by the setting change section (22b). On the other hand, if the determination result in step ST16 is NO, the process proceeds directly with step ST18.

In step ST18, the total sum $\Delta EV_{SUM}$ of ΔEV1 and ΔEV2 is calculated. Then, the process proceeds with step ST19 to reset the amount of change of opening ΔEV in accordance with the opening of the high stage side expansion valve (12). In this embodiment, the high stage side expansion valve (12) comes into a full-closed position when the output pulse number is 0 and comes into a full-open position when the output pulse number is 2000. The opening is changed in accordance with the output pulse number of 0 through 2000.

In this case, the opening control is made so that even if $\Delta EV_{SUM}$ values calculated in step ST18 are the same, the amount of change of opening is large when the opening of the high stage side expansion valve (12) is large and on the contrary the amount of change of opening is small when the opening of the high stage side expansion valve (12) is small. In short, the amount of change of opening is changed in accordance with the opening. This change of the amount of change of opening is made by the opening change section (22d) More specifically, in step ST19, the opening of the high stage side expansion valve (12) at the current time is identified by EVP and the amount of change of opening ΔEV is changed to ΔEV (EVP/1000)×10×$\Delta EV_{SUM}$.

Next, the process proceeds with step ST20 to determine the sign of ΔEV. If the sign of ΔEV is a negative pulse number, i.e., an amount of change of opening in a direction to close the high stage side expansion valve (12) (if the opening is decreased), the process proceeds with step ST22. It is to be noted that prior to proceeding with-step ST22, the process may run resetting of ΔEV in such a manner as to multiply ΔEV by a specified number larger than 1. On the other hand if ΔEV is a positive pulse number, i.e., an amount of change of opening in a direction to open the high stage side expansion valve (12) (if the opening is increased), the process proceeds with step ST21 to run resetting of ΔEV in such a manner as to multiply ΔEV by a specified number smaller than 1. In this case, ΔEV determined in step ST19 is multiplied by 0.7. It is to be noted that such resetting of ΔEV is made by the opening change section (22d). In step ST22, ΔEV thus obtained is output to the high stage side expansion valve (12) so that the opening thereof is changed.

In this refrigerating system (1b), the high stage side refrigerant circuit (3) is provided with the accumulator (24). Therefore, once the suction gas in the high stage side refrigerant circuit (3) enters in a wet state, liquid refrigerant will be stored in the accumulator (24), while reduced in the high stage side receiver (11). Accordingly, even if the opening of the high stage side expansion valve (12) is increased, the amount of cooling by the high stage side refrigerant in the cascade condenser (5) will not be increased and the high pressure in the low stage side refrigerant circuit (2) shows a tendency not to decrease enough to measure up to the increase of the opening of the high stage side expansion valve (12). To cope with this, in the embodiment, such characteristics of the system are taken into account so that the processing of steps ST15 through ST17 are made, thereby preventing excessive opening of the high stage side expansion valve (12).

Further, if the high stage side expansion valve (12) is excessively opened when no accumulator (24) is provided, this may also invite liquid back of the high stage side compressor (18). Even in such a case, however, liquid back can be obviated by implementing the processing of steps ST15 through ST17.

In this embodiment, since the amount of change of the opening ΔEV is changed in steps ST20 and ST21 in accordance with the opening of the high stage side expansion valve (12), it can be prevented that the liquid refrigerant may be excessively stored in the accumulator (24) due to excessive opening of the high stage side expansion valve (12).

Though in this embodiment the total sum of ΔEV1 and ΔEV2 is identified by $\Delta EV_{SUM}$ in step ST18, it should be noted that specified weighting may be made to both the amounts of change of opening ΔEV1 and ΔEV2 by multiplying them by respective specified factors and either the high pressure in the low stage side refrigerant circuit (2) or the superheating degree of the suction refrigerant in the high stage side refrigerant circuit (3) may be controlled with a higher priority. In other words, priorities can be assigned to a plurality of state parameters (such as high pressure or superheating degree of the suction refrigerant) by adequately multiplying the amounts of change of opening by respective specified factors.

Fourth Embodiment

Figure 8:
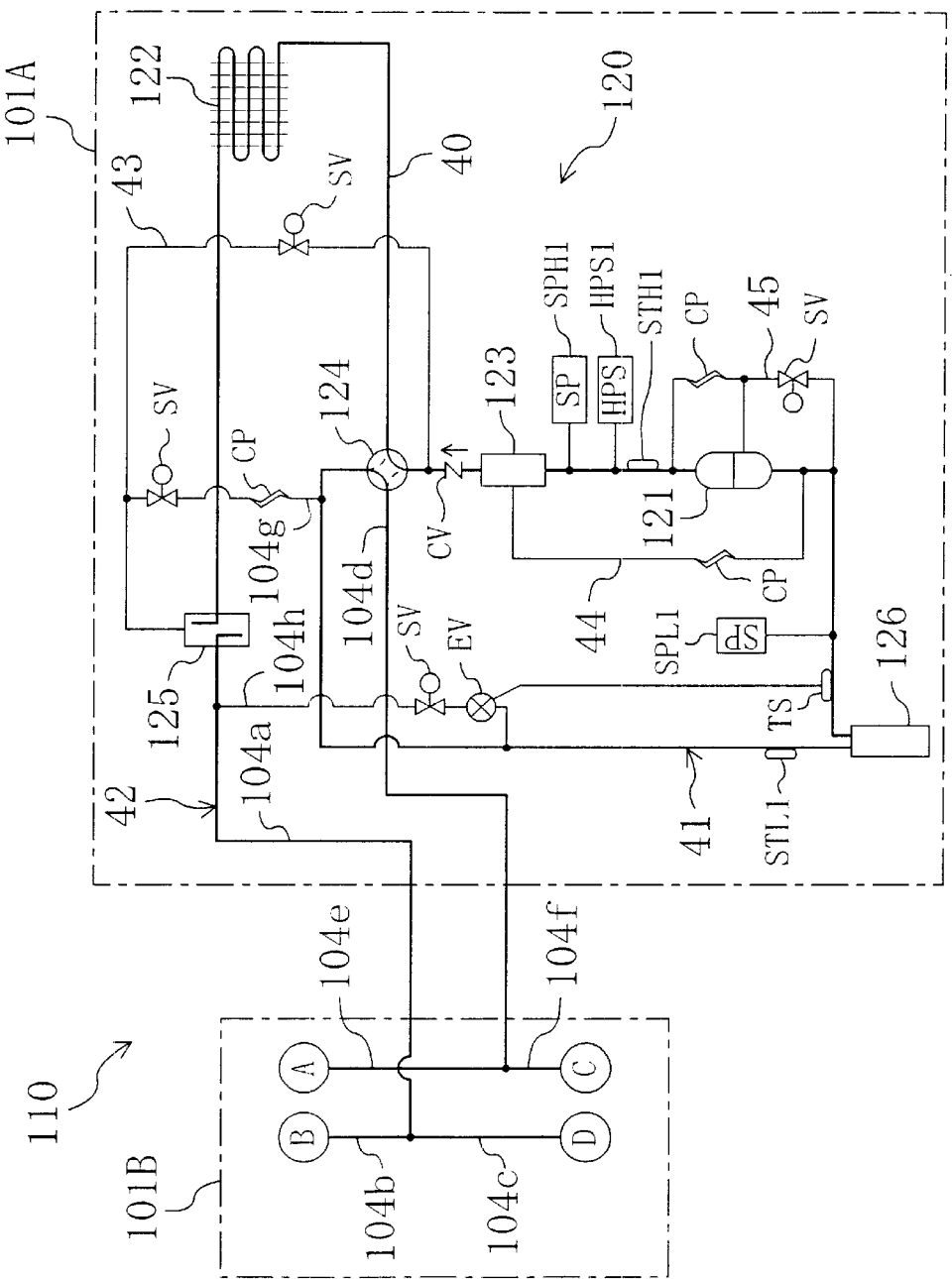
FIG. 8 is a refrigerant circuit diagram showing part of a refrigerating system according to a fourth embodiment.
Figure 9:
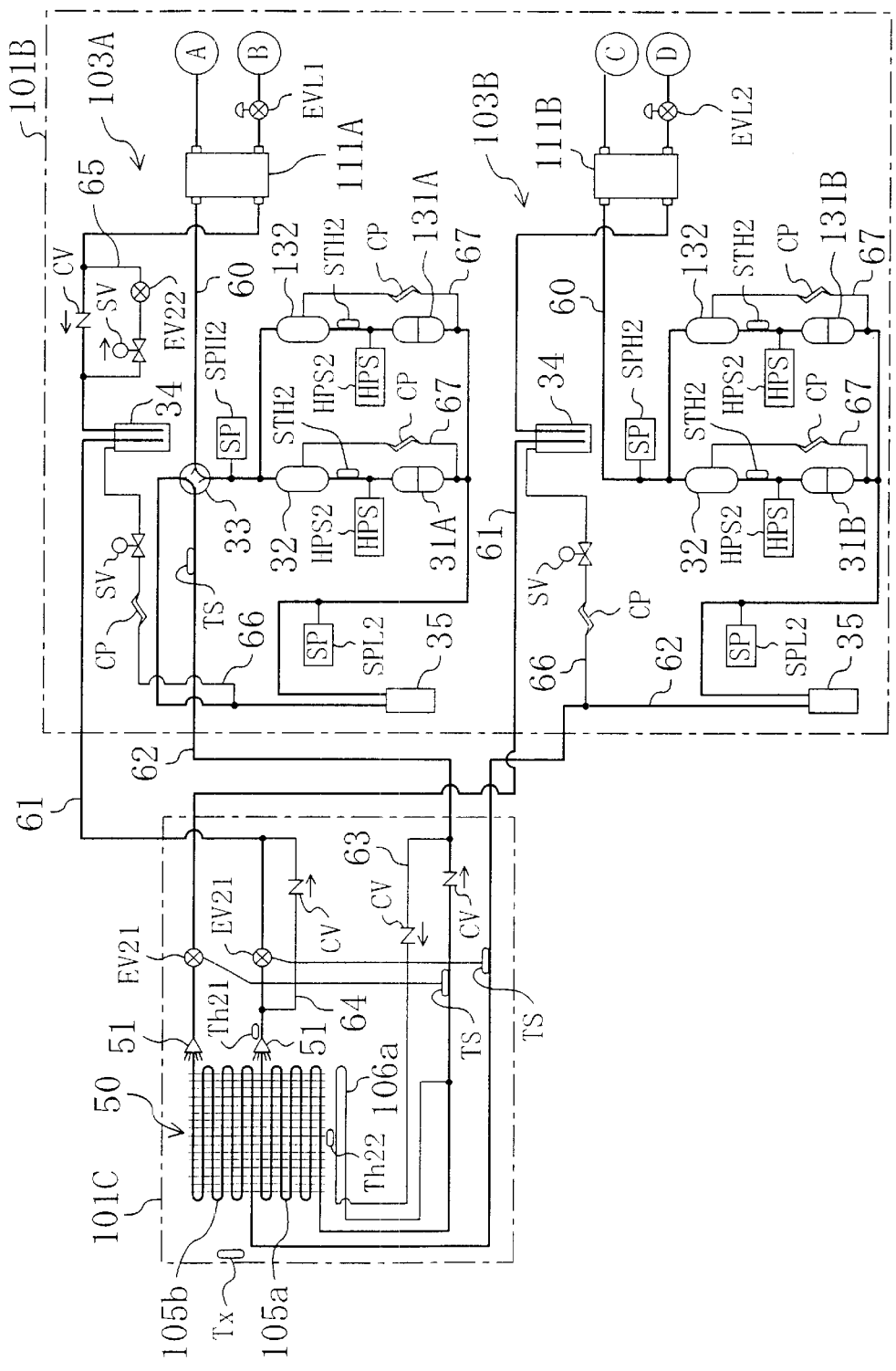
FIG. 9 is another refrigerant circuit diagram showing part of the refrigerating system according to the fourth embodiment.

As shown in FIGS. 8 and 9, a binary refrigerating system (110) according to a fourth embodiment is for cooling in a chiller or a freezer and includes an outdoor unit (101A), a cascade unit (101B) and a cooling unit (101C). Each of these units (101A), (101B) and (101C) is formed by accommodating components in a specific casing, though it is not shown. A high stage side refrigerant circuit (120) is constituted by the outdoor unit (101A) and part of the cascade unit (101B). Two low stage side refrigerant circuits (103A) and (103B) are formed over the cascade unit (101B) and the cooling unit (101C).

The high stage side refrigerant circuit (120) is arranged to provide reversible operation by switching the direction of refrigerant circulation between a forward cycle and a reverse cycle. Further, the high stage side refrigerant circuit (120) includes a high stage side compressor (121), a condenser (122) and evaporation sections of two refrigerant heat exchangers (cascade heat exchangers) (111A) and (111B). The evaporation sections of the refrigerant heat exchangers (111A) and (111B) constitute an evaporator in the high stage side refrigerant circuit (120).

A first gas pipe (40) is connected to the discharge side of the high stage side compressor (121) and a second gas pipe (41) is connected to the suction side thereof. The first gas pipe (40) connects the high stage side compressor (121), an oil separator (123) and a four-way selector valve (124) in this order and is then connected to one end of the condenser (122). The other end of the condenser (122) is connected with one end of a liquid pipe (42). The liquid pipe (42) is constituted by a main pipe (104a) and two branch pipes (104b) and (104c). The branch pipes (104b) and (104c) are connected to the evaporation sections of the two refrigerant heat exchangers (111A) and (111B), respectively.

The main pipe (104a) of the liquid pipe (42) is connected with a bypass pipe (104h) connected to the second gas pipe (41). The bypass pipe (104h) is provided with a solenoid valve (SV) and a temperature-sensitive expansion valve (EV). The branch pipes (104b) and (104c) are provided with first and second cooling motor-operated expansion valves (ELV1) and (ELV2), respectively. These cooling motor-operated expansion valves (ELV1) and (ELV2) correspond to those called "motor-operated expansion valves" in the present invention.

The second gas pipe (41) is constituted by a main pipe (104d) and two branch pipes (104e) and (104f). The main pipe (104d) of the second gas pipe (41) connects the high stage side compressor (121), an accumulator (126) and the four-way selector valve (124) in this order, while the branch pipes (104e) and (104f) are connected to the evaporation sections of the refrigerant heat exchangers (111A) and (111B), respectively. In other words, the evaporation sections of the two refrigerant heat exchangers (111A) and (111B) are connected in parallel with each other in the high stage side refrigerant circuit (120).

It is to be noted that the branch pipes (104b), (104c), (104e) and (104f) of the liquid pipe (42) and the second gas pipe (41) are provided in the cascade unit (101B).

A gas passage (43) is connected between the first gas pipe (40) and a receiver (125). One end of the gas passage (43) is connected to a portion of the first gas pipe (40) located between the four-way selector valve (124) and the compressor (123), and the other end thereof is connected to an upper portion of the receiver (125). The gas passage (43) is provided with a shut-off valve (SV) and arranged to effect high pressure control during a cooling operation and degassing during a defrosting operation. Further, the gas passage (43) is connected with a bypass pipe (104g) connected to the second gas pipe (41). The bypass pipe (104g) is provided with a shut-off valve (SV) and a capillary tube (CP)

An oil backing passage (44) equipped with a capillary tube (CP) is connected between the oil separator (123) and the suction side of the high stage side compressor (121). An unloading passage (45) equipped with a capillary tube (CP) and a shut-off valve (SV) is connected between the discharge and suction sides of the high stage side compressor (121) and connected at its intermediate portion to the high stage side compressor (121).

Further, the first gas pipe (40) on the discharge side of the high stage side compressor (121) is provided with a high-pressure sensor (SPH1) for sensing the pressure of a high-pressure refrigerant and a high-pressure switch (HPS1) for outputting an OFF signal when the pressure of the high-pressure refrigerant excessively rises up to a predetermined pressure. The second gas pipe (41) on the suction side of the high stage side compressor (121) is provided with a low-pressure sensor (SPL1) for sensing the pressure of a low-pressure refrigerant.

The first low stage side refrigerant circuit (103A) is arranged to provide reversible operation by switching the direction of refrigerant circulation between a forward cycle and a reverse cycle. Further, the first low stage side refrigerant circuit (103A) includes first and second low stage side compressors (31A) and (131A), a condensation section of the first refrigerant heat exchanger (111A) and an evaporating heat transfer pipe (105a). The condensation section of the refrigerant heat exchanger (111A) constitutes a condenser in the first low stage side refrigerant circuit (103A). The first low stage side compressor (31A) and the second low stage side compressor (131A) are connected in parallel with each other.

The discharge sides of the compressors (31A) and (131A) are provided with oil separators (32) and (132), respectively. The downstream sides of both the oil separators (32) and (132) are connected to one end of the condensation section of the first refrigerant heat exchanger (111A) via a four-way selector valve (33) and a first gas pipe (60). The other end of the condensation section is connected to one end of the evaporating heat transfer pipe (105a) via a check valve (CV), a receiver (34) and a cooling expansion valve (EV21) by a liquid pipe (61). The other end of the evaporating heat transfer pipe (105a) is connected to the suction sides of both the low stage side compressors (31A) and (131A) via a check valve (CV), the four-way selector valve (33) and an accumulator (35) by a second gas pipe (62).

The first refrigerant heat exchanger (111A) is a cascade condenser having the evaporation section of the high stage side refrigerant circuit (120) and the condensation section of the first low stage side refrigerant circuit (103A) and is constituted by a plate-type heat exchanger. In the first refrigerant heat exchanger (111A), a refrigerant in the first low stage side refrigerant circuit (103A) exchanges heat with a refrigerant in the high stage side refrigerant circuit (120). As a result, the refrigerant in the first low stage side refrigerant circuit (103A) radiates heat to condense, while the refrigerant in the high stage side refrigerant circuit (120) absorbs heat to evaporate.

It is to be noted that the cooling expansion valve (EV21) is a temperature-sensitive expansion valve and a temperature-sensing bulb (TS) is disposed in the second gas pipe (62) located on the outlet side of the evaporating heat transfer pipe (105a).

The first low stage side refrigerant circuit (103A) is arranged to effect a defrosting operation in a reverse cycle and therefore includes a drain pan passage (63), a gas bypass passage (64) and a pressure reduction passage (65). The drain pan passage (63) is connected to both ends of the check valve (CV) in the second gas passage (62), is provided with a drain pan heater (106a) and a check valve (CV) and is arranged so that a refrigerant (hot gas) discharged from the compressor (31) flows therethrough.

The gas bypass passage (64) is connected to both ends of the cooling expansion valve (EV21) in the liquid pipe (61), includes a check valve (CV) and is arranged so that a liquid refrigerant bypasses the cooling expansion valve (EV21) during the defrosting operation.

The pressure reduction passage (65) is connected to both ends of the check valve (CV) in the liquid-pipe (.61), includes a shut-off valve (SV) and a defrosting expansion valve (EV22) and is arranged to reduce the pressure of the liquid refrigerant during the defrosting operation. It is to be noted that the defrosting expansion valve (EV22) is a temperature-sensitive expansion valve and a temperature-sensing bulb is disposed at a location on the second gas pipe (62) upstream of the accumulator (35).

The upper portion of the receiver (34) is connected with one end of a degassing passage (66). The degassing passage (66) includes a shut-off valve (SV) and a capillary tube (CP). The other end of the degassing passage (66) is connected to a location on the second gas pipe (62) upstream of the accumulator (35).

Oil backing passages (67) and (67) each including a capillary tube (CP) are connected between the corresponding oil separators (32) and (132) and the corresponding suction sides of the low stage side compressors (31A) and (131A), respectively.

The first gas pipes (60) and (60) on the discharge sides of the low stage side compressors (31A) and (131A) are provided with high-pressure switches (HPS2) and (HPS2) for outputting an OFF signal when the pressure of the high-pressure refrigerant excessively rises up to a predetermined pressure and temperature sensors (STH2) and (STH2) for sensing the temperature of a discharge gas refrigerant, respectively. A high-pressure sensor (SPH2) for sensing the pressure of a high-pressure refrigerant is provided between the confluence of pipes on the discharge sides of both the low stage side compressors (31A) and (131A) and the four-way selector valve (33). The second gas pipe (62) on the suction sides of both the low stage side compressors (31A) and (131A) is provided with a low-pressure sensor (SPL2) for sensing the pressure of a low-pressure refrigerant.

The second low stage side refrigerant circuit (103B) has substantially the same configuration as that of the first low stage side refrigerant circuit (103A) but is arranged to effect a cooling operation alone without effecting a defrosting operation. The second low stage side refrigerant circuit (103B) does not include such a four-way selector valve (124) as included in the first low stage side refrigerant circuit (103A) and also is not provided with a drain pan passage (63), a gas bypass passage (64) and a pressure reduction passage (65). In other words, the second low stage side refrigerant circuit (103B) is formed by connecting first and second low stage side compressors (31B) and (131B), a condensation section of the second refrigerant heat exchanger (111B), a receiver (34), a cooling expansion valve (EV21), an evaporating heat transfer pipe (105b) and an accumulator (35) in this order by a first gas pipe (60), a liquid pipe (61) and a second gas pipe (62). The condensation section of the second refrigerant heat exchanger (111B) constitutes a condenser in the second low stage side refrigerant circuit (103B).

The cooling expansion valve (EV21) is a temperature-sensitive expansion valve and a temperature-sensing bulb is disposed in the second gas pipe (62) located on the outlet side of the evaporating heat transfer pipe (105b). The second refrigerant heat exchanger (111B) is a cascade condenser having the evaporation section of the high stage side refrigerant circuit (120) and the condensation section of the second low stage side refrigerant circuit (103B) and is constituted by a plate-type heat exchanger. In the second refrigerant heat exchanger (111B), a refrigerant in the second low stage side refrigerant circuit (103B) exchanges heat with the refrigerant in the high stage side refrigerant circuit (120). As a result, the refrigerant in the second low stage side refrigerant circuit (103B) radiates heat to condense, while the refrigerant in the high stage side refrigerant circuit (120) absorbs heat to evaporate.

The evaporating heat transfer pipes (105a) and (105b) of both the low stage side refrigerant circuits (103A) and (103B) are formed into a single evaporator (50). In the evaporator (50), the refrigerants in both the low stage side refrigerant circuits (103A) and (103B) are heat exchanged with the in-storage air. The evaporator (50), the cooling expansion valve (EV21) and the drain pan passage (63) are disposed in the cooling unit (101C), while other components such as the compressors (31A), (131A), (31B) and (131B) are disposed in the cascade unit (101B).

Furthermore, a liquid temperature sensor (Th21) for sensing the temperature of a liquid refrigerant is disposed at a location on the liquid pipe (61) upstream of a distributor (51) in the first low stage side refrigerant circuit (103A), and an evaporator temperature sensor (Th22) for sensing the temperature of the evaporator (50) is disposed evaporator (50).

In the storage, an in-storage temperature sensor (Tx) for sensing the air temperature in the storage is disposed.

Figure 10:
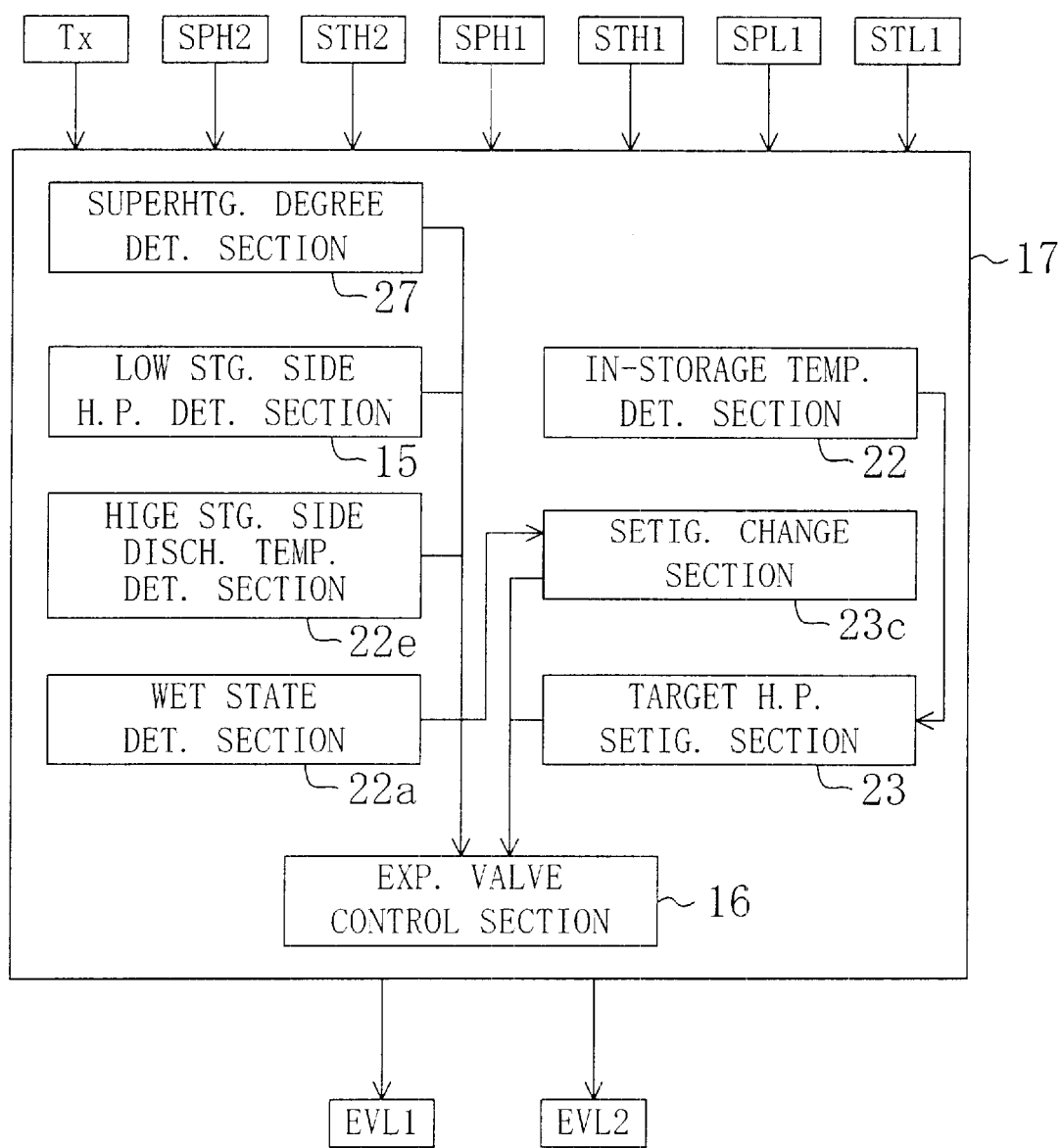
FIG. 10 is a block diagram of an expansion valve control section according to the fourth embodiment.

As shown in FIG. 10, a controller (17) includes a low stage side high pressure detecting section (15), a superheating degree detecting section (27), an in-storage temperature detecting section (22), a target high pressure setting section (23), a high stage side discharge temperature detection section (22e), a setting change section (23c), a wet state detecting section (22a) and an expansion valve control section (16).

Behavior of Refrigerating System in Operation

Behavior of the refrigerating system (110) during the cooling operation will be next described.

In this refrigerating system (110), the first and second low stage side compressors (31A) and (131A) in the first. low stage side refrigerant circuit (103A) are operated at low refrigerating load in the storage, while the first and second low stage side compressors (31A), (131A), (31B) and (131B) in both the low stage side refrigerant circuits (103A) and (103B) are operated at high refrigerating load in the storage In other words, the system operates at low in-storage load a total of two compressors (31A) and (131A) or, on the contrary, at high in-storage load a total of four compressor (31A), (131A), (31B) and (131B).

Behavior of the system in operation at high in-storage load will be here described. In this case, the high stage side compressor (121) in the high stage side refrigerant circuit (120) and the first and second low stage side compressors (31A), (131A), (31B) and (131B) in both the low stage side refrigerant circuits (103A) and (103B) are actuated together. Under these conditions, in the high stage side refrigerant circuit (120), the four-way selector valve (124) is operated to select its port connection shown in solid lines in FIG. 8 and the below-described opening control of each of the cooling motor-operated expansion valves (EVL1) and (EVL2) is carried out.

In the high stage side refrigerant circuit (120), a high stage side refrigerant discharged from the high stage side compressor (121) condenses into a liquid refrigerant in the condenser (122) and then flows into the cascade unit (101B). The liquid refrigerant is then distributed between the two branch pipes (104b) and (104c) and reduced in pressure in the cooling motor-operated expansion valves (EVL1) and (EVL2). Thereafter, the liquid refrigerant evaporates into a gas refrigerant in each of the evaporation sections of the two refrigerant heat exchangers (111A) and (111B) and returns to the high stage side compressor (121). The refrigerant repeats this circulation.

On the other hand, in the first low stage side refrigerant circuit (103A), the four-way selector valve (33) is operated to select its port connection shown in solid lines in FIG. 9, the defrosting expansion valve (EV22) is fully closed and the cooling expansion valve (EV21) is controlled according to superheat control. In the second low stage side refrigerant circuit (103B), the cooling expansion valve (EV21) is controlled according to superheat control.

In both the low stage side refrigerant circuits (103A) and (103B), low stage side refrigerants discharged from the low stage side compressors (31A), (131A), (31B) and (131B) condense into liquid refrigerants in the condensation sections of the refrigerant heat exchangers (111A) and (111B), respectively. These liquid refrigerants are reduced in pressure in the cooling expansion valves (EV21) and (EV21) Thereafter, the liquid refrigerants evaporate into gas refrigerants in the evaporating heat transfer pipes (105a) and (105b), respectively, and return to the low stage side compressors (31A), (131A), (31B) and (131B). The refrigerants repeat such circulation.

Further, in each of the refrigerant heat exchangers (111A) and (111B), the high stage side refrigerant exchanges heat with the low stage side refrigerant and the low stage side refrigerants in the low stage side refrigerant circuits (103A) and (103B) are cooled to condense. On the other hand, in the evaporator (50), the low stage side refrigerants evaporate to generate cooled air and the cooled air cools the inside of the storage.

Operation Control

Figure 11:
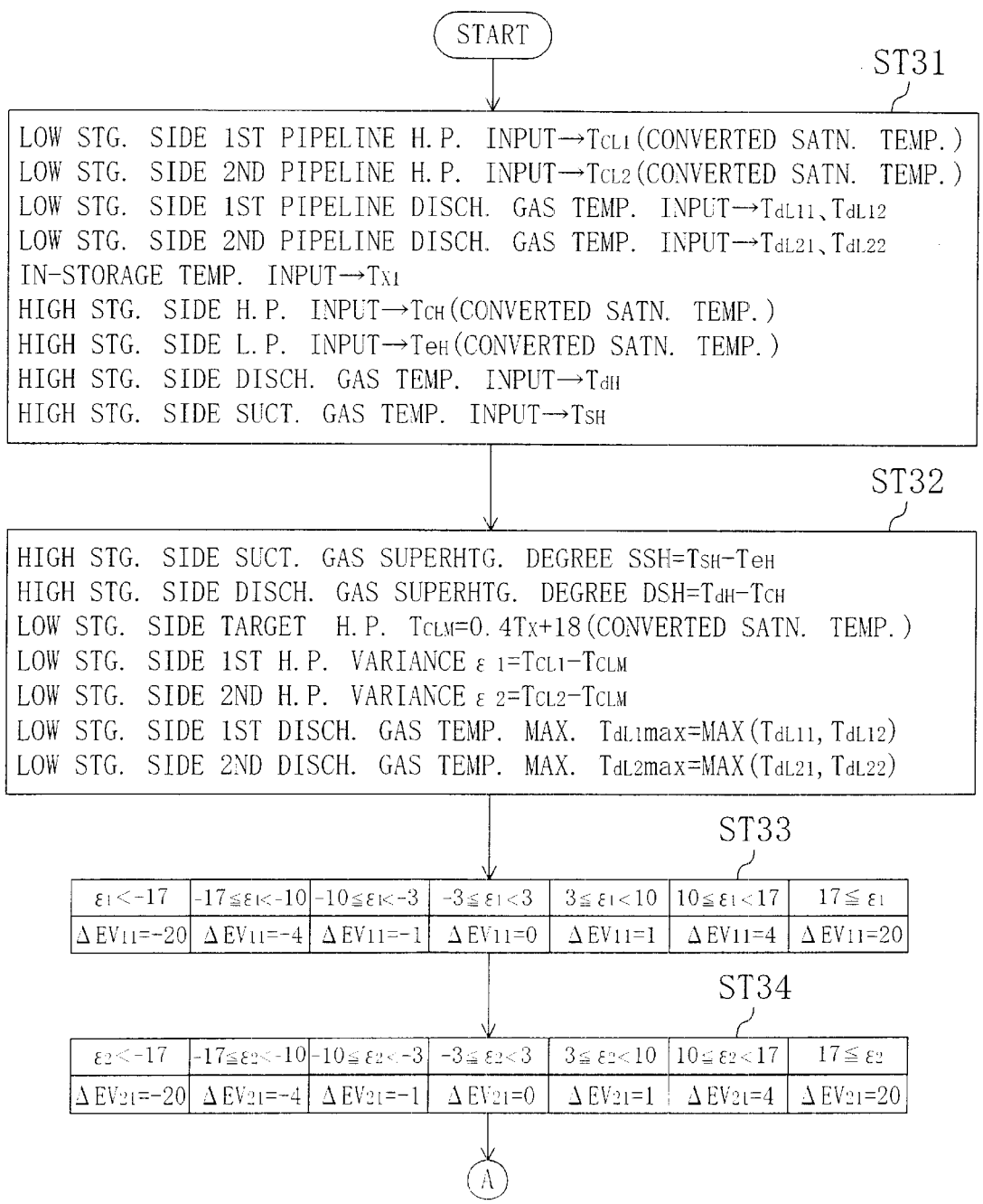
FIG. 11 is part of a flow chart of control over an expansion valve according to the fourth embodiment.
Figure 12:
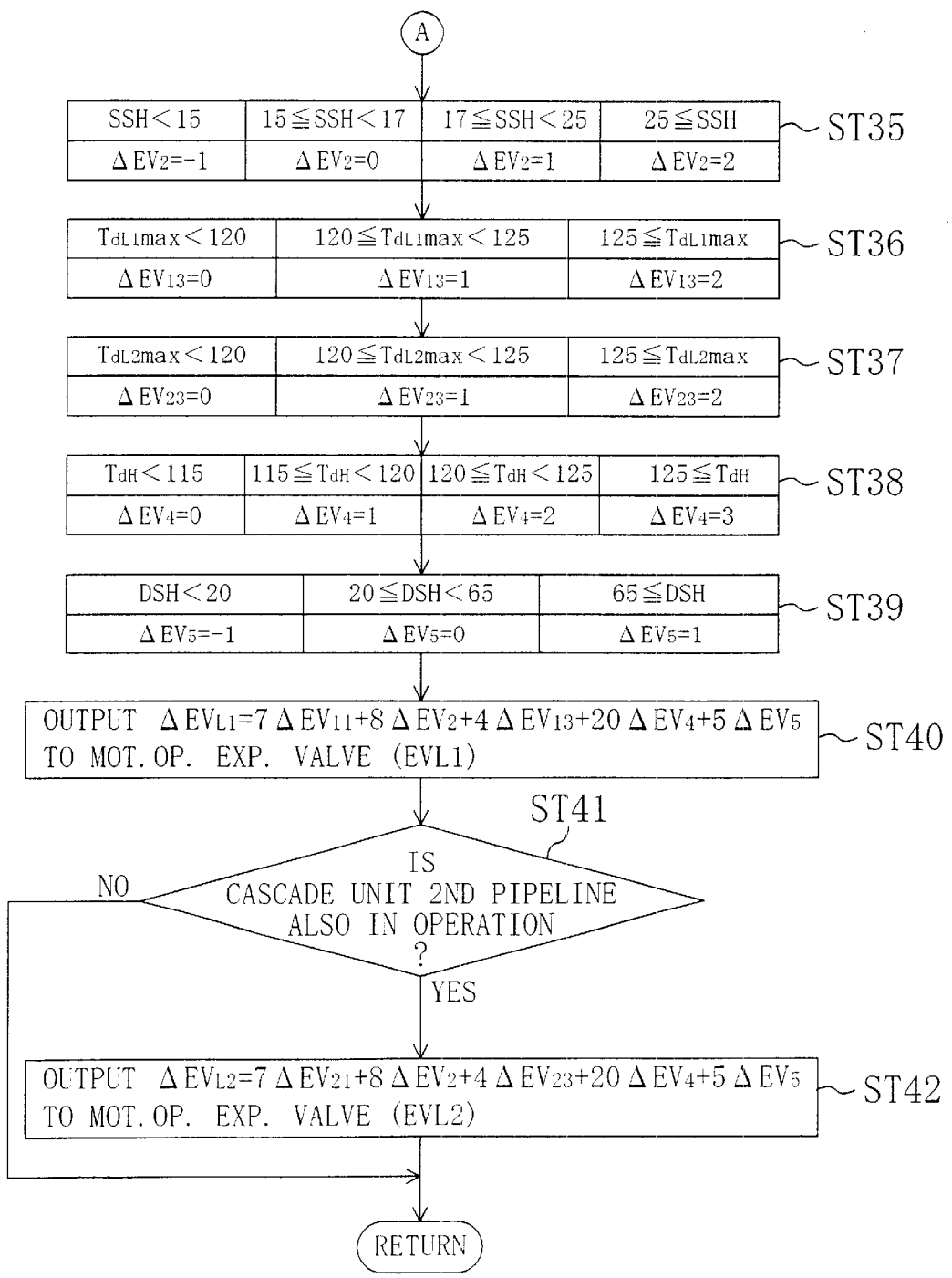
FIG. 12 is another part of the flow chart of control over the expansion valve according to the fourth embodiment.
Figure 13:
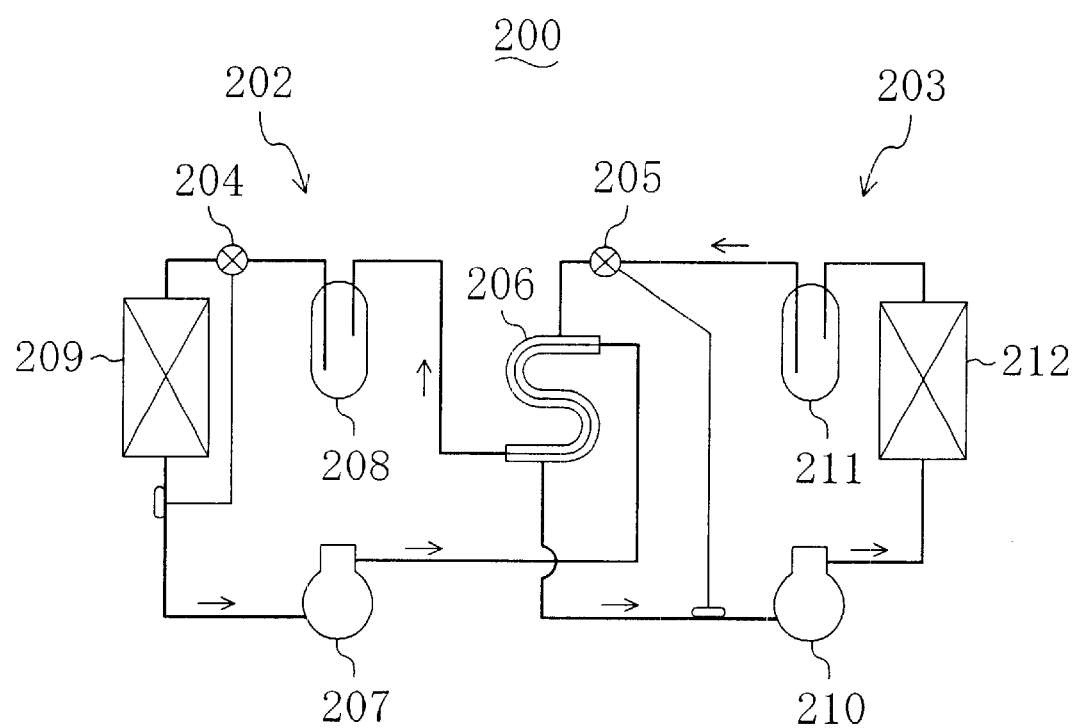
FIG. 13 is a diagram showing the structure of a conventional refrigerating system.

A method for controlling the refrigerating system (110) during its cooling operation will be next described with reference to flow charts of FIGS. 11 and 12.

First in step ST31, upon receipt of detection signals from the sensors (SPH2), (STH2), (TX), (SPH1), (SPL1), (STH1) and (STL1), an equivalent saturation temperature $Tc_{L1}$ for a high pressure in the first low stage side refrigerant circuit (103A), an equivalent saturation temperature $Tc_{L2}$ for a high pressure in the second low stage side refrigerant circuit (103B), discharge gas temperatures $Td_{L11}$ and $Td_{L12}$ of the first and second low stage side compressors (31A) and (131A) in the first low stage side refrigerant circuit (103A), discharge gas temperatures $Td_{L21}$ and $Td_{L22}$ of the first and second low stage side compressors (31B) and (131B) in the second low stage side refrigerant circuit (103B), an in-storage air temperature Tx, an equivalent saturation temperature $TC_H$ for a high pressure in the high stage side refrigerant circuit (120), an equivalent saturation temperature $Te_H$ for a low pressure in the high stage side refrigerant circuit (120), a discharge gas temperature $Td_H$ of the high stage side compressor (121) in the high stage side refrigerant circuit (120) and a suction gas temperature $TS_H$ of the high stage side compressor (121) are input.

Next, the process proceeds with step ST32 to calculate a superheating degree of a high stage side suction gas $SSH = Ts_H - Te_H$, a superheating degree of a high stage side discharge. gas $DSH = Td_H - Tc_H$, an equivalent saturation temperature for a low stage side target high pressure $Tc_{LM} = 0.4Tx+18$, a variance in high pressures of the first low stage side refrigerant circuit (103A) $\epsilon 1 = Tc_{L1} - Tc_{LM}$, a variance in high pressures of the second low stage side refrigerant circuit (103B) $\epsilon 2 = Tc_{L2} - Tc_{LM}$, a maximum discharge gas temperature in the first low stage side refrigerant circuit (103A) $Td_{1max} = MAX(Td_{L11}, Td_{L12})$ and a maximum discharge gas temperature in the second low stage side refrigerant circuit (103B) $Td_{2max} = MAX(Td_{L21}, Td_{L22})$ Next, in steps ST33 through ST39, amounts of change of opening are calculated based on the above respective state variables.

Specifically, in step ST33, an amount of change of opening ΔEV11 is determined based on the variance $\epsilon_1$ in high pressures of the first low stage side refrigerant circuit (103A). Next, the process proceeds with step ST34 to determine an amount of change of opening ΔEV21 based on the variance $\epsilon_2$ in high pressures of the second low stage side refrigerant circuit (103B). It is to be noted that ΔEV11 and ΔEV21 correspond to those called "first amounts of change of opening" in the present invention. Next, the process proceeds with step ST35 to determine an amount of change of opening ΔEV2 ("second amount of change of opening") based on the superheating degree SSH of the high stage side suction gas. Next, the process proceeds with step ST36 to determine an amount of change of opening ΔEV13 based on the maximum discharge gas temperature $Td_{max}$ in the first low stage side refrigerant circuit (103A). Next, the process proceeds with step ST37 to determine an amount of change of opening ΔEV23 based on the maximum discharge gas temperature $Td_{2max}$ in the second low stage side refrigerant circuit (103B) It is to be noted that ΔEV13 and ΔEV23 correspond to those called "amounts of increase of opening" in the present invention. Next, the process proceeds with step ST38 to determine an amount of change of opening ΔEV4 ("amount of increase of opening") based on the high stage side discharge gas temperature $Td_H$. Next, the process proceeds with step ST39 to determine an amount of change of opening ΔEV5 ("amount of decrease of opening") based on the superheating degree DSH of the high stage side discharge gas.

Then, the process proceeds with step ST40 to determine an amount of change of the opening ΔEVL1 of the first cooling motor-operated expansion valve (EVL1) from the equation ΔEVL1=7ΔEV11+8ΔEV2+4ΔEV13+20ΔEV4+5ΔEV5.

Next, the process proceeds with step ST41 to determine whether the second low stage side refrigerant circuit (103B) is in operation. If the determination is YES, the process proceeds with step ST42 to determine an amount of change of the opening ΔEVL2 of the second cooling motor-operated expansion valve (EVL2) from the equation ΔEVL2= 7ΔEV21+8ΔEV2+4ΔEV23+20ΔEV4+5ΔEV5. If the determination is NO, change of the opening of the second cooling motor-operated expansion valve (EVL2) is not made.

As described so far, according to the fourth embodiment, the first cooling motor-operated expansion valve (EVL1) is controlled based on the high pressure in the first low stage side refrigerant circuit (103A) and the superheating degree of the suction gas in the high stage side refrigerant circuit (120) and additionally the discharge gas temperature in the first low stage side refrigerant circuit (103A), the discharge gas temperature in the high stage side refrigerant circuit (120) and the superheating degree of the suction gas in the high stage side refrigerant circuit (120), while the second cooling motor-operated expansion valve (EVL2) is controlled based on the high pressure in the second low stage side refrigerant circuit (103B) and the superheating degree of the suction gas in the high stage side refrigerant circuit (120) and additionally the discharge gas temperature in the second low stage side refrigerant circuit (103B), the discharge gas temperature in the high stage side refrigerant circuit (120) and the superheating degree of the suction gas in the high stage side refrigerant circuit (120).

As can be seen from the above, the present embodiment is a so-called multi-system in which the low stage side refrigerant circuitry (103A, 103B) is composed of a plurality of pipelines and therefore load variation of the low stage side refrigerant circuitry (103A, 103B) is extremely large. Accordingly, the effects of the present invention can be remarkably exerted.

Industrial Applicability

As can be seen from the above, the present invention is useful for air conditioners, freezers, chillers and so on.

What is claimed is:

1. A refrigerating system comprising:
   a high stage side refrigerant circuit (3, 120) formed by connecting a high stage side compressor (9, 18, 121), a condenser (10, 122), a motor-operated expansion valve (12, EVL1, EVL2) and a refrigerant heat exchanger (5, 11A, 111B) in this order;
   a low stage side refrigerant circuit (2, 103A, 103B) formed by connecting a low stage side compressor (4, 31A, 31B, 131A, 131B), the refrigerant heat exchanger (5, 111A, 111B), an expansion mechanism (7, EV21) and an evaporator (8, 50) in this order;
   high pressure sensing means (SPH2), provided in the low stage side refrigerant circuit (2, 103A, 103B), for sensing the high pressure in the low stage side refrigerant circuit (2, 103A, 103B); and
   expansion valve control means (16) for controlling the motor-operated expansion valve (12, EVL1, EVL2) of the high stage side refrigerant circuit (2, 120) so that the pressure sensed by the high pressure sensing means (SPH2) reaches a predetermined target high pressure.

2. The refrigerating system as claimed in claim 1, further comprising:
   temperature sensing means (Tx) for sensing the temperature of the substance to be cooled by the evaporator (8, 50); and
   target high pressure setting means (23) for setting the target high pressure of the expansion valve control means (16) based on the temperature sensed by the temperature sensing means (Tx).

3. The refrigerating system as claimed in claim 1, further comprising:
   low pressure sensing means (SPL2), provided in the low stage side refrigerant circuit (2, 103A, 103B), for sensing the low pressure in the low stage side refrigerant circuit (2, 103A, 103B); and
   target high pressure setting means (23) for setting the target high pressure of the expansion valve control means (16) based on the pressure sensed by the low pressure sensing means (SPL2).

4. The refrigerating system as claimed in claim 1, further comprising:
   temperature sensing means (Tx) for sensing the temperature of the substance to be cooled by the evaporator (8);
   low pressure sensing means (SPL2), provided in the low stage side refrigerant circuit (2), for sensing the low pressure in the low stage side refrigerant circuit (2);
   transient state detecting means (23a) for determining whether the operation of the system is in a transient state based on preset particular determination conditions and outputting a predetermined transient state signal upon detection of the transient state or outputting a predetermined non-transient state signal upon detection of a non-transient state; and
   target pressure setting means (23) for setting upon receipt of the transient state signal the target high pressure of the expansion valve control means (16) based on the temperature sensed by the temperature sensing means (Tx) or setting upon receipt of the non-transient state signal the target high pressure based on the pressure sensed by the low pressure sensing means (SPL2).

5. The refrigerating system as claimed in claim 1, further comprising:
   superheating degree detecting means (27) for sensing the superheating degree of a suction gas refrigerant of the high stage side compressor (18, 121) in the high stage side refrigerant circuit (3, 120); and
   the expansion valve control means (16) being arranged to control the motor-operated expansion valve (12, EVL1, EVL2) of the high stage side refrigerant circuit (3, 120) so that the pressure sensed by the high-pressure sensing means (SPH2) and the superheating degree sensed by the superheating degree detecting means (27) reach a predetermined target high pressure and a predetermined target superheating degree, respectively.

6. The refrigerating system as claimed in claim 5, further comprising:
   the expansion valve control means (16) being set to calculate a first amount of change of opening (ΔEV1) based on the pressure sensed by the high-pressure sensing means (SPH2), calculate a second amount of change of opening (ΔEV2) based on the superheating degree sensed by the superheating degree detecting means (27) and change the opening of the motor-operated expansion valve (12) of the high stage side refrigerant circuit (3) based on the first amount of change of opening (ΔEV1) and the second amount of change of opening (ΔEV2); and
   setting change means (22b) for changing the setting of the expansion valve control means (16) so that the expansion valve control means (16) changes the opening of the motor-operated expansion valve (12) solely based on the second amount of change of opening (ΔEV2) when the sensed superheating degree is a value beyond a predetermined range and the first amount of change of opening (ΔEV1) is positive.

7. The refrigerating system as claimed in claim 1, further comprising:
   superheating degree detecting means (27) for sensing the superheating degree of a suction gas refrigerant of the high stage side compressor (121) in the high stage side refrigerant circuit (120);
   discharge gas temperature sensing means (STH2) for sensing the temperature of a discharge gas of the low stage side compressor (31A, 31B, 131A, 131B) in the low stage side refrigerant circuit (103A, 103B);
   the expansion valve control means (16) being set to calculate a first amount of change of opening (ΔEV11, ΔEV21) based on the high pressure in the low stage side refrigerant circuit (103A, 103B), calculate a second amount of change of opening (ΔEV2) based on the superheating degree sensed by the superheating degree detecting means (27) and change the opening of the motor-operated expansion valve (EVL1, EVL2) of the high stage side refrigerant circuit (120) based on the first amount of change of opening (ΔEV11, ΔEV21) and the second amount of change of opening (ΔEV2); and
   setting change means (23c) for calculating an amount of increase of opening (ΔEV13, ΔEV23) based on the temperature sensed by the discharge gas temperature sensing means (STH2) when the sensed temperature is equal to or above a predetermined temperature and then changing the setting of the expansion valve control means (16) so that the expansion valve control means (16) changes the opening of the motor-operated expansion valve (EVL1, EVL2) based on the first amount of change of opening (ΔEV11, ΔEV21) and the second amount of change of opening (ΔEV2) and additionally the amount of increase of opening (ΔEV13, ΔEV23).

8. The refrigerating system as claimed in claim 1, further comprising:
   superheating degree detecting means (27) for sensing the superheating degree of a suction gas refrigerant of the high stage side compressor (121) in the high stage side refrigerant circuit (120);
   discharge gas temperature sensing means (STH1) for sensing the temperature of a discharge gas refrigerant of the high stage side compressor (121) in the high stage side refrigerant circuit (120);
   the expansion valve control means (16) being set to calculate a first amount of change of opening (ΔEV11, ΔEV21) based on the high pressure in the low stage side refrigerant circuit (103A, 103B), calculate a second amount of change of opening (ΔEV2) based on the superheating degree sensed by the superheating degree detecting means (27) and change the opening of the motor-operated expansion valve (EVL1, EVL2) of the high stage side refrigerant circuit (120) based on the first amount of change of opening (ΔEV11, ΔEV21) and the second amount of change of opening (ΔEV2); and setting change means (23c) for calculating an amount of increase of opening (ΔEV4) based on the temperature sensed by the discharge gas temperature sensing means (STH1) when the sensed temperature is equal to or above a predetermined temperature and then changing the setting of the expansion valve control means (16) so that the expansion valve control means (16) changes the opening of the motor-operated expansion valve (EVL1, EVL2) based on the first amount of change of opening (ΔEV11, ΔEV21) and the second amount of change of opening (ΔEV2) and additionally the amount of increase of opening (ΔEV4).

9. The refrigerating system as claimed in claim 1, further comprising:

superheating degree detecting means (27) for sensing the superheating degree of a suction gas refrigerant of the high stage side compressor (121) in the high stage side refrigerant circuit (120);

discharge gas temperature sensing means (STH1) for sensing the temperature of a discharge gas of the high stage side compressor (121) in the high stage side refrigerant circuit (120);

wet state detecting means (22a) for determining whether the suction gas refrigerant of the high stage side compressor (121) in the high stage side refrigerant circuit (120) is in a wet state based on preset determination conditions and outputting a predetermined wet state signal upon detection of the wet state;

the expansion valve control means (16) being set to calculate a first amount of change of opening (ΔEV11, ΔEV21) based on the high pressure in the low stage side refrigerant circuit (103A, 103B), calculate a second amount of change of opening (ΔEV2) based on the superheating degree sensed by the superheating degree detecting means (27) and change the opening of the motor-operated expansion valve (EVL1, EVL2) of the high stage side refrigerant circuit (120) based on the first amount of change of opening (ΔEV11, ΔEV21) and the second amount of change of opening (ΔEV2); and setting change means (23c) for calculating an amount of decrease of opening (ΔEV5) based on the wet state upon receipt of the wet state signal from the wet state detecting means (22a) and then changing the setting of the expansion valve control means (16) so that the expansion valve control means (16) changes the opening of the motor-operated expansion valve (EVL1, EVL2) based on the first amount of change of opening (ΔEV1, ΔEV21) and the second amount of change of opening (ΔEV2) and additionally the amount of decrease of opening (ΔEV5).

10. The refrigerating system as claimed in claim 1, further comprising:

opening change means (22d) for sensing the opening of the motor-operated expansion valve (12) and causing the expansion valve control means (16) to change the amount of change of opening according to the sensed opening to increase the amount of change of opening when the opening is large or decrease the:amount of change of opening when the opening is small.

11. The refrigerating system as claimed in claim 1, further comprising:

an accumulator (24) provided between the refrigerant heat exchanger (5) and the suction side of the high stage side compressor (18) in the high stage side refrigerant circuit (3); and opening change means (22d) for sensing a change in the opening of the motor-operated expansion valve (12) and causing the expansion valve control means (16) to change the amount of change of opening according to increase/decease in the sensed opening to decrease the amount of change of opening when the opening is increased or increase the amount of change of opening when the opening is decreased.

12. The refrigerating system as claimed in claim 1, wherein the refrigerant heat exchanger is constituted by a plate-type heat exchanger (5).

* * * * *

UNITED STATES PATENT AND TRADEMARK OFFICE
CERTIFICATE OF CORRECTION

PATENT NO. : 6,405,554 B1
DATED : June 18, 2002
INVENTOR(S) : Noriyasu Kawakatu et al.

It is certified that error appears in the above-identified patent and that said Letters Patent is hereby corrected as shown below:

Title page,
Item [54], Title, delete "REFRIGERATOR" add -- REFRIGERATING SYSTEM --.

Column 1,
Line 51, claim 1 should read as follows:
1.  A refrigerating system comprising:
a high stage side refrigerant circuit (3, 120) formed by
    connecting a high stage side compressor (9, 18, 121), a
    condenser (10, 122), a motor-operated expansion valve
    (12, EVL1, EVL2) and a refrigerant heat exchanger (**5,
    111A, 111B**) in this order;
a low stage side refrigerant circuit (2, 103A, 103B)
    formed by connecting a low stage side compressor (**4,
    31A, 31B, 131A, 131B**), the refrigerant heat exchanger
    (5, 111A, 111B), an expansion mechanism (7, EV21)
    and a evaporator (8, 50) in this order;
high pressure sensing means (SPH2), provided in the low
    stage side refrigerant circuit (2, 103A, 103B), for
    sensing the high pressure in the low stage side refrig-
    erant circuit (2, 103A, 103B); and
expansion valve control means (16) for controlling the
    motor-operated expansion valve (12, EVL1, EVL2) of
    the high stage side refrigerant circuit (2, 120) so that the
    pressure sensed by the high pressure sensing means
    (SPH2) reaches a predetermine target high pressure.

Column 25, line 16 through Column 26, line 12,
Claims 9 and 10 should read as follows:
9.  The refrigerating system as claimed in claim 1, further
comprising:
superheating degree detecting means (27) for sensing the
    superheating degree of a suction gas refrigerant of the
    high stage side compressor (121) in the high stage side
    refrigerant circuit (120);
discharge gas temperature sensing means (STH1) for
    sensing the temperature of a discharge gas of the high
    stage side compressor (121) in the high stage side
    refrigerant circuit (120);

UNITED STATES PATENT AND TRADEMARK OFFICE
CERTIFICATE OF CORRECTION

PATENT NO.    : 6,405,554 B1
DATED         : June 18, 2002
INVENTOR(S)   : Noriyasu Kawakatu et al.

It is certified that error appears in the above-identified patent and that said Letters Patent is hereby corrected as shown below:

<u>Column 25, line 16 through Column 26, line 12 (cont'd),</u>
wet state detecting means (22*a*) for detecting whether
    the suction gas refrigerant of the high stage side compressor (121) in the high stage side refrigerant circuit (120) is in a wet state based on preset determination conditions and outputting a predetermined wet state signal upon detection of the wet state;
the expansion valve control means (16) being set to
    calculate a first amount of change of opening ($\Delta EV11$, $\Delta EV21$) based on the high pressure in the low stage side refrigerant circuit (103A, 103B), calculate a second amount of change of opening ($\Delta EV2$) based on the superheating degree sensed by the superheating degree detecting means (27) and change the opening of the motor-operated expansion valve (EVL1, EVL2) of the high stage side refrigerant circuit (120) based on the first amount of change of opening ($\Delta EV11$, $\Delta EV21$) and the second amount of change of opening ($\Delta EV2$); and
setting change means (23*c*) for calculating an amount of
    decrease of opening ($\Delta EV5$) based on the wet state upon receipt of the wet state signal from the wet state detecting means (22*c*) and then changing the setting of the expansion valve control means (16) so that the expansion valve control means (16) changes the opening of the motor-operated expansion valve (EVL1, EVL2) based on the first amount of change of opening ($\Delta EV11$, $\Delta EV21$) and the second amount of change of opening ($\Delta EV2$) and additionally the amount of decrease of opening ($\Delta EV5$).

UNITED STATES PATENT AND TRADEMARK OFFICE
CERTIFICATE OF CORRECTION

PATENT NO.    : 6,405,554 B1
DATED         : June 18, 2002
INVENTOR(S)   : Noriyasu Kawakatu et al.

It is certified that error appears in the above-identified patent and that said Letters Patent is hereby corrected as shown below:

<u>Column 25, line 16 through Column 26, line 12 (cont'd),</u>
10.   The refrigerating system as claimed in claim 1, further comprising:
opening change means (*22d*) for sensing the opening of
    the motor-operated expansion valve (12) and causing
    the expansion valve control means (16) to change the
    amount of change of opening according to the sensed
    opening to increase the amount of change of opening
    when the opening is large or decrease the amount of
    change of opening when the opening is small.

Signed and Sealed this

Eleventh Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,405,554 B1
DATED : June 18, 2002
INVENTOR(S) : Noriyasu Kawakatu et al.

It is certified that error appears in the above-identified patent and that said Letters Patent is hereby corrected as shown below:

<u>Title page,</u>
Item [56], References Cited, FOREIGN PATENT DOCUMENTS, please add to paragraph:

-- FOREIGN PATENT DOCUMENTS
    JP    7-127935    05/1995
    JP    57-5562    01/1982
    JP    2-48825    10/1990 --

Signed and Sealed this

Eighth Day of June, 2004

JON W. DUDAS
*Acting Director of the United States Patent and Trademark Office*